(12) United States Patent
Witte et al.

(10) Patent No.: US 11,907,197 B2
(45) Date of Patent: Feb. 20, 2024

(54) VOLUME PLACEMENT FAILURE ISOLATION AND REPORTING

(71) Applicant: NetApp, Inc., San Jose, CA (US)

(72) Inventors: Wesley R. Witte, Campbell, CA (US); Youyuan Wu, San Jose, CA (US)

(73) Assignee: NETAPP, INC., San Jose, CA (US)

( * ) Notice: Subject to any disclaimer, the term of this patent is extended or adjusted under 35 U.S.C. 154(b) by 149 days.

(21) Appl. No.: 17/465,445

(22) Filed: Sep. 2, 2021

(65) Prior Publication Data

US 2023/0070038 A1    Mar. 9, 2023

(51) Int. Cl.
*G06F 16/00* (2019.01)
*G06F 16/22* (2019.01)
*G06F 16/2453* (2019.01)

(52) U.S. Cl.
CPC ...... *G06F 16/2291* (2019.01); *G06F 16/2453* (2019.01); *G06F 2201/80* (2013.01)

(58) Field of Classification Search
CPC ............. G06F 16/1824; G06F 16/2291; G06F 16/2453; G06F 2201/80
See application file for complete search history.

(56) References Cited

U.S. PATENT DOCUMENTS

| | | | | |
|---|---|---|---|---|
| 6,505,217 | B1* | 1/2003 | Venkatraman | G06F 3/0601 |
| 2013/0111129 | A1* | 5/2013 | Maki | G06F 3/0689 |
| | | | | 711/E12.016 |
| 2015/0081965 | A1* | 3/2015 | Nagao | G06F 3/0644 |
| | | | | 711/114 |

* cited by examiner

*Primary Examiner* — Thu Nguyet T Le
(74) *Attorney, Agent, or Firm* — HAYNES AND BOONE, LLP

(57) ABSTRACT

Systems, methods, and machine-readable media are disclosed for isolating and reporting a volume placement error for a request to place a volume on a storage platform. A volume placement service requests information from a database using an optimized database query to determine an optimal location to place a new volume. The database returns no results. The volume placement service deconstructs the optimized database query to extract a plurality of queries. The volume placement service iterates over the plurality queries, combining queries in each iteration, to determine a cause for the database to return no results. The volume placement service determines based on the results of each iterative database request a cause the database to return an empty result. The volume placement service provides an indication of the cause for returning an empty result.

20 Claims, 11 Drawing Sheets

VOLUME PLACEMENT FAILURE ISOLATION AND REPORTING

TECHNICAL FIELD

The present description relates to volume placement in a storage system. More specifically, the present description relates to systems and methods for volume placement error isolation and handling within the storage system.

BACKGROUND

Cloud computing involves the on-demand availability of cloud resources, such as storage and compute resources, to requesting users. Often, cloud compute providers may make these cloud resources available to users with an accompanying storage solution. Sometimes, cloud computing providers might not be the best suited provider of reliable cloud storage solutions. To provide a better service for the user, the cloud computing provider may partner with a storage platform. The cloud computing providers may do so without any extra effort from the user.

Problems arise, however, because of the added complexity of combining the separate cloud computing and storage platforms and determining where to place a volume therein. This includes problems with automatic placement of storage volumes within the cloud computing and storage platforms. For example, approaches that rely on sending a series of database queries individually are resource intensive and therefore slow. As another example, approaches that rely on a sending a series of database queries as a group for determining volume placement may provide little to no feedback and therefore obscure why candidate locations are eliminated from consideration. Such schemes further may create problems with identifying how to react to a failure to place a volume due to the lack of feedback.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method includes receiving a first empty result from a database in response to an optimized query sent to the database for retrieving a location to place a volume, the optimized query including a plurality of queries. The method further includes sending a first query of the plurality of queries to the database, the first query providing a level of filtering of possible locations to place the volume. The method further includes receiving a second result from the database in response to the first query. The method further includes sending the first query and a second query of the plurality of queries to the database, the first query and second query requesting a list of possible locations to place the volume. The method further includes receiving a third result in response to the first query and the second query with the third result being empty. The method further includes analyzing the third result and the second query to determine a cause of the empty third result. The method further includes responding to a request to place the volume with an error code indicating a reason for failing to provide a location to place the volume.

In an additional aspect of the disclosure, a computing device includes a memory containing machine readable medium including machine executable code having stored thereon instructions for performing a method of isolating a failure to provide a location for placing a volume in a plurality of storage systems. The computing device further includes a processor coupled to the memory, the processor configured to execute the machine executable code to cause the processor to receive a trigger to replay an optimized query to identify a location to place a volume in response to a first result of the optimized query from a database being empty, the optimized query including a plurality of queries. The processor can be further configured to send a first query of the plurality of queries to the database as part of the replay of the optimized query, the first query providing a level of filtering of possible locations to place the volume. The processor can be further configured to receive a second result from the database in response to the first query. The processor can be further configured to send the first query and a second query of the plurality of queries to the database as part of the replay of the optimized query, the first query and second query requesting a list of possible locations to place the volume. The processor can be further configured to receive a third result from the database in response to the first query and the second query, the third result being empty. The processor can be further configured to determine a cause of the empty third result based at least in part on the second query of the plurality of queries, including identifying a location in an object hierarchy of the database where a failure occurred. The processor can be further configured to respond to a request to place the volume with an indication of the failure to place the volume.

In an additional aspect of the disclosure, a non-transitory machine-readable medium having stored thereon instructions for performing a method of isolating a failure to provide a location for placing a volume in a plurality of storage systems, when executed by at least one machine, causes the at least one machine to send an optimized query to a database in response to a request for a location to place a volume, the optimized query including a plurality of queries. The instructions, when executed by the at least one machine, further causes the at least one machine to send an optimized query to a database in response to a request for a location to place a volume, the optimized query including a plurality of queries. The instructions further cause the machine to send a first query of the plurality of queries to the database in response to receiving a first empty result from the database. The instructions further cause the machine to send the first query and a second query of the plurality of queries to the database in response to receiving a second empty result from the database responsive to the first query, the second query providing a level of filtering of possible locations to place the volumes. The instructions further cause the machine to respond to the request for a location place the volume with an error indicating a reason for failing to provide a location to place the volume in response to receiving a third empty result from the database responsive to the first and the second query. The instructions further cause the machine to automatically modify the request for the location to place the volume based on the reason for failing to provide the location in response to receiving the error.

Other aspects will become apparent to those of ordinary skill in the art upon reviewing the following description of exemplary embodiments in conjunction with the figures. While one or more embodiments may be discussed as having certain advantageous features, one or more of such features may also be used in accordance with the various embodiments of the invention discussed herein. In similar fashion, while exemplary embodiments may be discussed below as device, system, or method embodiments, it should be understood that such exemplary embodiments can be implemented in various devices, systems, and methods.

BRIEF DESCRIPTION OF THE DRAWINGS

The present disclosure is best understood from the following detailed description when read with the accompanying figures.

DETAILED DESCRIPTION

Figure 1:
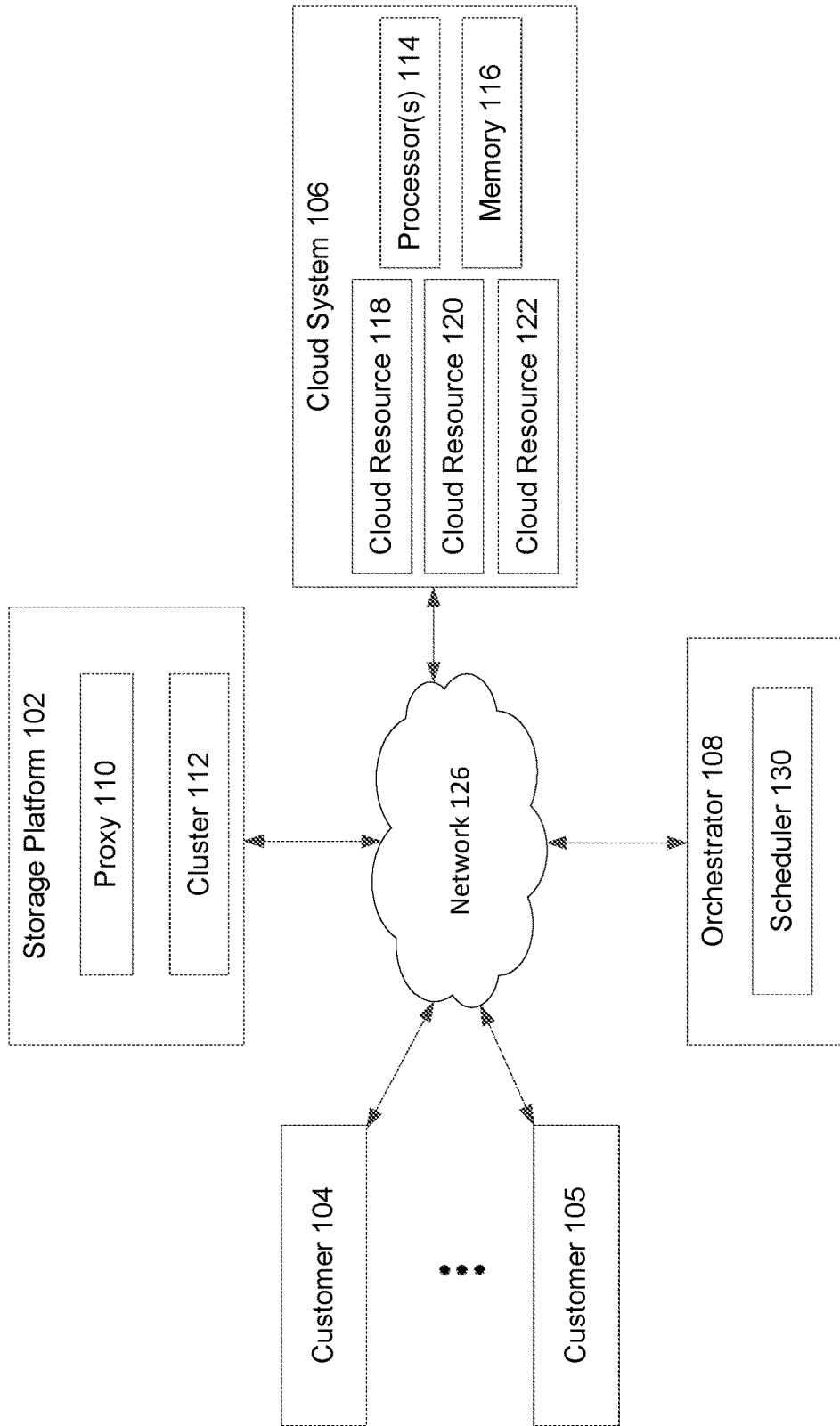
FIG. 1 illustrates a cloud provider environment according to some embodiments of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for determining an optimal location for placing one or more volumes on a storage platform. This may be accomplished with a resource tracking component and a volume placement determination component that operate in cooperation with each other to determine the optimal location for placing the one or more volumes. For example, the resource tracking component may track and/or request usage data from hardware and/or software resources connected to the storage platform. The resource tracking component may then store the usage data in a database for later retrieval. The volume placement determination component may determine an optimal location to create the one or more volumes in response to receiving a request to place the one or more volumes. To do this, the volume placement determination component may perform a series of database queries to determine the optimal location. The database queries may be pipelined in order to improve the speed and efficiency of determining a location. That is, the series of queries may be sent to the database with little to no intermediate interaction between the volume placement determination component and the database. After determining an optimal location for creating the volume, the cloud storage platform creates the volume.

Sometimes, a location to place the volume may not be found. The volume placement determination component may use the information included in the schema to filter out cloud computing clusters, operating cluster, nodes, and aggregates that do not satisfy the request to create or modify a volume. According to embodiments of the present disclosure, the volume placement determination component may construct a complex query, including the information in the schema, to send to the database. In some embodiments, the complex query may be a combination of multiple queries that has been optimized to improve the operation of the database. The database may return an empty result to the volume placement determination component in response to the complex query, resulting in a failure to place the requested volume.

After receiving the empty result from the database, the volume placement determination component may deconstruct the complex query into its constituent parts, resulting in a plurality of queries. The volume placement determination component may then iteratively build a new combined query based on the constituent parts, sending each iteration of the combined query to the database, and receiving a result from the database for each iteration of the combined query. The volume placement determination component may use the iterative results to determine a cause for the failure to find a location to place the volume. For example, the plurality of queries may include three queries. In a first iteration, the volume placement determination component may send a first query to the database and receive a result. The volume placement determination component may then send a combined query including the first query and a second query to the database and receive a result. The volume placement determination component may then send a combined query including the first query, the second query, and a third query and receive a result. Alternatively, the volume placement determination component may stop after the combined query including the first and second queries if the result returned is empty.

While the above example is a simple example including three queries and a single volume placement request, it should be understood that the embodiments of the present disclosure also apply to requests to create multiple volumes and requests that include any number of queries. The volume placement determination component may iterate over each of the queries in this process for as many queries as there are in the plurality of queries or until an empty result is received from the database. The volume placement determination component may use the results and the queries to determine a cause for the empty result to complex, optimized query. This process allows the volume placement determination component to determine a cause for not finding a location to place the volume. This cause may then be returned as an error or indicator so that the volume placement request may be modified to find a location to place the volume.

As a result, cloud storage platforms according to embodiments of the present disclosure provide improved feedback to the users and system operators over current systems. In general operation, the volume placement determination component may continue to use the series of database queries (e.g., pipeline of queries) to provide quick and efficient volume placement determinations. In the event of a failure to find a location, the volume placement determination component may iterate over the series of database queries to determine a cause for the failure to determine a location to place the requested volume. As a result of embodiments of the present disclosure, operation of storage clusters is improved by providing feedback as to the cause of a failure to place the requested volume without unnecessarily slowing down the entire system. Moreover, with this improved feedback information, the system is able to fine-tune placement requests in order to improve the placement of that, or subsequent, volumes.

FIG. 1 illustrates a cloud provider environment 100 according to some embodiments of the present disclosure. The cloud provider environment 100 may include, among other things, a storage platform 102, one or more customers 104, 105, a cloud system 106, and an orchestrator 108. These aspects of the cloud provider environment 100 may communicate with each other via a network 126. The network 126 may be, for example, the Internet, a local area network, a wide area network, and/or a wireless network (to name a few examples). The network 126 may include a variety of transmission media including cables, optical fibers, wireless routers, firewalls, switches, gateways, and/or other devices to facilitate communications between one or more of the aspects of the environment 100.

Cloud system 106 may be a provider of cloud infrastructure for one or more customers 104, 105 (representing generally any number of customers, with two as a simple example). Cloud system 106 may provide a variety of cloud computing solutions, such as infrastructure as a service (IaaS), software as a service (SaaS), and/or platform as a service (PaaS) as some examples. For example, cloud system 106 may be a public cloud provider, examples of which include Amazon Web Services™ (AWS™) Microsoft® Azure®, and Google Cloud Platform™. These are by way of illustration. The cloud system 106 may represent a multi-tenant cloud provider that may host a variety of virtualization tools that customers 104, 105 may request to host or otherwise run one or more applications (e.g., via the network 126 and/or orchestrator 108). Alternatively (or additionally), the cloud system 106 may represent a private cloud provider, such as an enterprise cloud for a given organization.

Cloud system 106, generally, may provide infrastructure including any set of resources used for executing one or more containers, virtual machines, or other hosted virtualization tool(s). Resources may include CPU resources, memory resources, caching resources, storage space resources, communication capacity resources, etc. that a virtualization tool such as a container may use for execution of one or more workloads for customers 104, 105. These resources are illustrated in FIG. 1 as cloud resources 118, 120, and 122 of cloud system 106. These may represent any number of cloud resources in any of a variety of combinations. As just one example, the cloud resources 118-122 may be in the form of one or more AWS EC2™ instances, or other instance type from a cloud provider.

Cloud system 106 may further include a processor 114, which may be one or more processors such as multiple processors. The processor 114 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 114 may also be implemented as a combination of computing devices, e.g., a combination of a DSP and a microprocessor, a plurality of microprocessors, one or more microprocessors in conjunction with a DSP core, or any other such configuration.

The processor 114 may be connected to memory 116 to execute one or more instructions stored in the memory 116 by the processor 114. The memory 116 may include a cache memory (e.g., a cache memory of the processor 114), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 116 includes a non-transitory computer-readable medium. The memory 114 may store, or have recorded thereon, instructions. The instructions may include instructions that, when executed by the processor 114, cause the processor 114 to perform the operations described herein, such as for hosting one or more containers. Instructions may also be referred to as machine executable code. The machine executable code may be for causing a device to perform these operations, for example by causing one or more processors to control or command the device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

For example, a customer 104 (or 105, but referring to 104 for simplicity herein) may run one or more virtualization layers, such as virtual machines and/or containers on one or more cloud resources 118-122 of cloud system 106, via network 126. For example, a container may use a level of system level virtualization, such as by packaging up application code and its dependencies (e.g., system tools, system libraries and/or settings, etc.) so that the hosted application can be executed reliably on one or more computing platforms of the cloud system 106 (as an example). Some examples of software may include, for example, Red Hat® OpenShift®, Docker® containers, chroot, Linux®-VServer, FreeBSD® Jails, HP-UX® Containers (SRP), VMware ThinApp®, etc. Containers may run on the cloud system 106 on a host operating system directly, or may be run via another layer of virtualization (such as within a virtual machine).

Customers 104, 105 may orchestrate one or more containers using the cloud resources 118-122 using orchestrator 108. Orchestration may refer to scheduling containers within a predetermined set of available infrastructure represented by the cloud resources 118-122. The orchestrator 108 may be used to determine the required infrastructure based upon the needs of containers being executed/requested for execution. For example, orchestrator 108 may map each container to a different set of cloud resources 118-122, such as by selecting a set of containers to be deployed on each cloud resource 118-122 that is still available for use. Examples of orchestrator 108 may include Kubernetes®, Docker Swarm®, AWS Elastic Container Service™, etc. Generally, it may refer to a container orchestrator that is executed on a host system of cloud system 106, such as via processor(s) 114 and memory 116, etc., using a host operating system. The orchestrator 108 may further include a scheduler 130. Scheduler 130 may be used make an actual request for infrastructure and allocation of containers to the infrastructure to the cloud system 106. An example of a scheduler 130 may include a Kubernetes® scheduler, which may execute on a host within network 126, either on the same hardware resources as orchestrator 108 or on other hardware and/or software resources.

The environment 100 may further include storage platform 102. Storage platform 102 is illustrated as separate from cloud system 106, though it may be an example of a cloud resource (e.g., cloud resources 118, 120, 122), as storage platform 102 may be hosted and/or managed by a different entity than the cloud system 106 (e.g., a different provider for storage than a public cloud provider), but operate in cooperation with the cloud system 106 to provide storage services to one or more customers 105, 106. The storage platform 102 may include a proxy 110 and a cluster 112, such as, for example, a Kubernetes® cluster or a Docker Swarm®. These may be executed by a processor or multiprocessor (such as one or more of the examples given above with respect to processor 114), memory (such as one or more of the examples given above with respect to memory 116. These may include instructions which, when executed by the processor(s) for the storage platform 102, cause the processor to perform the operations described herein with respect to collecting data on one or more resources, making volume(s) placement determinations (e.g., for one volume, or for multiple volumes created as a group), and/or creating volumes and placing them at the determined locations.

For example, while illustrated as separate from cloud system 106, the cluster 112 may, itself, be hosted by the cloud system 106 as a software-defined environment in which the storage platform 102 may make storage decisions according to embodiments of the present disclosure. In other examples, the storage platform 102 may include its own processor(s), memory(ies), and other resources that interface with the cloud system 106 with the instructions. In yet other examples, the cluster 112 may be hosted on a system that is external to both the storage platform 102 and the cloud system 106. The cloud system 106 and storage platform 102 may be jointly owned or owned by separate entities. The cloud system 106 and storage platform 102 may be co-located to improve storage access speed or they may be located in different data centers. The cloud system 106 and the storage platform 102 may work jointly to provide storage options to customers 104, 105 that are utilizing the capabilities of cloud system 106. The cloud system 106 may provide seamless access to the storage platform 102 for ease of use by the customers 104, 105.

According to embodiments of the present disclosure, storage platform 102 may function as a back-end storage service for cloud system 106. That is, storage platform 102 may support cloud system 106 in providing storage as a service (SaaS) to customers, including customers 104, 105. Storage platform 102 may include a storage operating system (OS) that specializes in providing advanced storage functions, such as deduplication, compression, synchronization, replication, snapshot creation/management, disaster recovery, backup and archive, high availability storage, cloning functionality, data tiering, encryption, multi-platform access, etc. In an example, the storage OS may execute within a storage virtual machine, a hyperscaler, or other computing environment. The storage OS may implement a storage file system to logically organize data within storage devices as one or more storage objects and provide a logical/virtual representation of how the storage objects are organized on the storage devices. A storage object may comprise any logically definable storage element stored by the storage operating system (e.g., a volume stored by a node, a cloud object, etc.). Each storage object may be associated with a unique identifier that uniquely identifies the storage object. For example, a volume may be associated with a volume identifier uniquely identifying that volume from other volumes. The storage OS also manages client access to the storage objects.

The storage OS may implement a file system for logically organizing data. For example, the storage OS may implement a write anywhere file layout for a volume where modified data for a file may be written to any available location. In an example, the file system may be implemented through a file system layer that stores data of the storage objects in an on-disk format representation that is block-based (e.g., data is stored within 4 kilobyte blocks and inodes are used to identify files and file attributes such as creation time, access permissions, size and block location, etc.). Other representations may be used instead or in addition. The storage OS may allow client devices to access data (e.g., through cloud system 106 in some examples) stored within the storage platform 102 using various types of protocols, such as a Network File System (NFS) protocol, a Server Message Block (SMB) protocol and Common Internet File System (CIFS), and Internet Small Computer Systems Interface (iSCSI), and/or other protocols.

In some examples, customers 104, 105 using cloud system 106 may request storage via cloud system 106. The cloud system 106 may, in turn, pass the storage request to storage platform 102 for processing and handling. For example, cloud system 106 may offer different storage options to customers 104, 105, including a storage resource available as cloud resource 118/120/122 (where offered/available), which may have limited, if any, functionality as compared to functionality offered by storage platform 102 implementing a storage OS. As another example, the cloud system 106 may specialize in cloud computing resources and storage platform 102 may specialize in cloud storage resources.

Generally, customers 104, 105 that utilize cloud system 106 may require additional storage that is not available as part of the cloud system 106 (or, alternatively, may require storage services in particular that are not available from cloud system 106's resources) but that is nevertheless available through the cloud system 106. This storage (and corresponding storage services) may be provided by storage platform 102 via cloud system 106. For example, in requesting storage, customer 104 may request a specific type of storage from cloud system 106. Cloud system 106 may then pass the request to proxy 110 of storage platform 102 to be fulfilled by cluster 112.

As described herein, the storage platform 102 may provide better optimization of storage for use by customers 104, 105. Depending on a variety of factors, storage platform 102 may fulfill the storage request of customer 104 such that customer 104 does not need to know that storage platform 102 is a different entity from cloud system 106. Customers 104, 105 therefore benefit from the specialized storage capabilities of storage platform 102 without any extra work by customers 104, 105. Such a separation further allows for management of storage systems while accounting for environment capabilities and limits.

For example, a resource tracking component (also referred to herein as a resource tracker) in the cluster 112 may track and/or request usage data from resources connected to the storage platform 102, and store the tracked data in a database. Further, a volume placement determination component (also referred to herein as a volume placement service) in the cluster 112 may act in response to the cloud system 106 receiving a request to create or modify a volume from a customer 104, 105 (which the cloud system 106 passes on to storage platform 102). A volume service in the cluster 112 may receive the request, package it into an extensible volume placement language schema, and convey that to the volume placement determination component. The volume placement determination component may, in response to this request as packaged into the schema, determine an optimal location to create the requested volume using the information included in the schema as well as usage and/or limitation data queried from the database. After determining an optimal location for creating the volume, the volume service may receive the determination from the volume placement determination component and, based on the information returned, create the volume within the storage platform 102.

Volume Placement Architecture

Figure 2A:
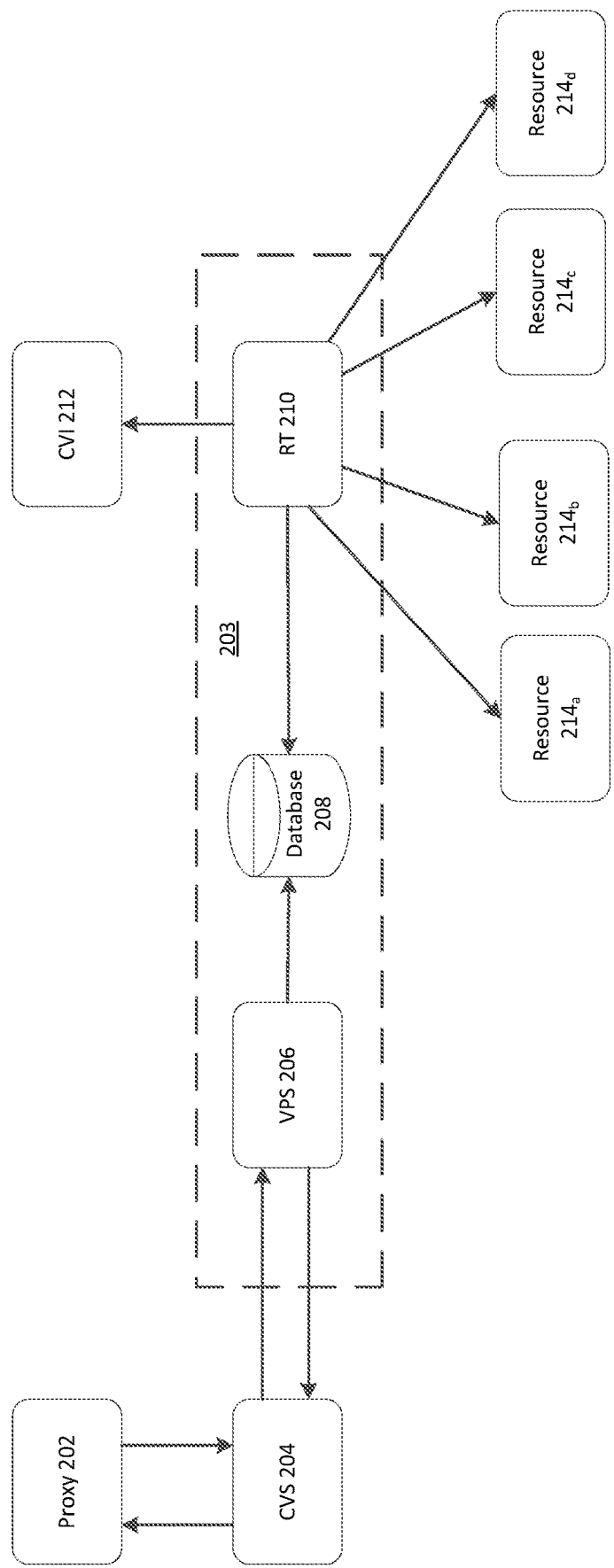
FIGS. 2A-2B illustrate a storage platform architecture according to some embodiments of the present disclosure.

Turning now to FIG. 2A, details of a storage platform 200 are illustrated according to embodiments of the present disclosure. The storage platform 200 may be an example of the storage platform 102 discussed above in FIG. 1. As introduced in FIG. 1, the storage platform 200 may be a back-end storage service for the cloud system 106. The cloud system 106 may communicate with the storage platform 200 through a proxy 202. Proxy 202 may be an example of Proxy 110 illustrated in FIG. 1. Examples of proxy 202 may include a Microsoft Azure Resource Provider or a NetApp Cloud Volume Proxy. Generally, the proxy 202 may provide one or more APIs for the cloud system 106 to communicate with cluster 203 of the storage platform 200.

Cluster 203 may be an example of the cluster 112 described above in FIG. 1. For example, cluster 203 may be a Kubernetes® cluster. In some examples, cluster 203 may be hosted on storage platform 102 (FIG. 1), while in other examples cluster 203 may be hosted in cloud platform 106 (FIG. 1), while in yet other examples cluster 203 may be hosted on a system external to storage platform 102 and cloud platform 106. As illustrated in FIG. 2A, cluster 203 may include a volume placement service (VPS) 206, a database 208, and a resource tracker (RT) 210. In other examples, cluster 203 may further include a cloud volume service (CVS) 204 and cloud volume infrastructure (CVI) tables 212. Cluster 203 may be running in a containerized environment, such as, for example, a Kubernetes® cluster, though other containerized environments are contemplated. In some examples, each component of the storage platform 200 may be running in a separate container that is deployed within the cluster. In some other examples, multiple components of the storage platform 200 may be running in the same container.

Storage platform 200 may further include resources $214_a$-$214_d$ which may be at least one of a storage resource, a switching resource, and/or a connection resource (i.e., endpoints that the RT 210 monitors/tracks). The storage resources may include storage nodes including various storage devices which may include, but not be limited to, hard drives, solid state drives, and hybrid drives. The switching resources may be managed switches connecting the various storage and computing nodes in a network. The connection resources may include a number of individual customer networks defined within the different cloud resources 118-122 and/or storage resources $214_a$-$214_d$.

The proxy 202 may be a single component, either software or hardware, or it may be multiple components (including a combination of software and hardware). That is, there may be multiple proxies 202, where, in an example, there may be one proxy 202 to receive storage requests from a Microsoft® Azure server and there may be another proxy 202 to receive storage requests from an Amazon AWS® server. In other examples, one proxy 202 may receive storage requests from multiple different cloud platforms. Reference will be made to a single proxy 202 for simplicity. The proxy 202 may receive a storage request to create or update a volume. The request may come from a user or from another system, such as, for example, the cloud system 106 of FIG. 1. The proxy 202 may then convert the storage request format to a common storage request format (such as an API call) and send the converted storage request to the CVS 204. The storage request to the CVS 204 may be made through an API published by the CVS 204.

The CVS 204 may provide an API for requesting storage from the storage platform 200. There may be one or more CVS 204 instances within a storage platform, such as for example, the storage platform 200. Additionally, there may be one or more storage platforms, each including one or more CVS 204 instances. The CVS 204 may allow the requestor to select among many different storage options including, but not limited to, volume size, storage speed, storage type, and designating multiple nodes for multiple volumes. The CVS 204 may create or modify the requested volume according to the request received from the proxy 202. The CVS 204 may populate a specification including the specified parameters (also referred to herein as constraints, storage constraints, etc.). The specification may be an example of an extensible volume placement language schema, for example JSON (JavaScript Object Notation) payload referred to herein also as a volume deployment specification (VDS). The VDS functions as the payload sent from the CVS 204 to the VPS 206 to place a volume or set of volumes. Specific details of the VDS will be discussed further below.

The VPS 206 may receive the specification, e.g., VDS, (which packaged the request from the customer 104, 105) from the CVS 204 and determine an optimal location to create or modify the requested volume based on parsing the information from the specification. In some examples, the CVS 204 is included in the cluster 203 with the VPS 206. In the depicted example, the CVS 204 is not included in the cluster 203. The CVS 204 may be part of the storage platform 200 and may communicate with the VPS 206 running in cluster 203. In some examples, cluster 203 may be external to the storage platform 200. In this way, one or more CVS 204 instances within one or more storage platforms 200 may communicate with a single VPS 206 to request volume placement locations. The VPS 206 may provide better informed volume placement locations by having visibility of all the resources within multiple storage platforms and/or clusters. Better informed volume placement locations will improve the overall efficiency and performance of each storage platform as compared to the previous round robin approach used by individual CVS 204 instances for managing volumes.

In some examples there may be a single VPS 206 that provides volume placement locations for a region of storage platforms. In other examples, there may be multiple VPS 206 that coordinate to provide volume placement locations for a region of storage platforms. In some examples, the VPS 206 of a first region communicates and coordinates volume placement with the VPS 206 of a second region. For example, a volume created in the first region may be mirrored in the second region. The creation of the volume and any subsequent changes to the volume (e.g., adding more space) may be coordinated between the VPS 206 of the first region and the VPS 206 of the second region.

The VPS 206 may identify one or more constraints provided in the specification (e.g., by parsing the specification) and may validate any inputs provided by the specification. Validation may include validation of the inputs to identify any invalid keywords, or conflicting entries. In some examples, the VPS 206 may be an image, such as a Docker image, deployed in the cluster 203. There may be any number of VPS pods (e.g., and may be run in different zones from each other), and may be configured to auto-scale should the overall service scale. Upon receiving the specification, the VPS 206 may query the database 208 for usage and limit data of the various resources $214_a$-$214_d$ of the storage platform 200 (e.g., those resources that may be specified by the specification, or all resources across clusters). The resource tracker (RT) 210 may store the usage data in database 208 as discussed below.

Resource limits stored in database 208 may be highly configurable. Resource limits may define percentage utilization of a storage device, bandwidth limits of a storage device, number of volumes available on a storage device, volume grouping on and among storage devices, number of connections in switching resources, total number of customer networks supported, and others. Default values for each resource may be stored in database 208. Additionally, override limits for each resource may be stored in database 208. For example, an override limit on the number of volumes in a storage resource may be used if a volume is consuming a large amount of resources, such as size or bandwidth. The database 208 may be, for example, run as a replica set with multiple replicas (e.g., 3). Such a replica set may provide redundancy and high data availability, with multiple copies of data on multiple servers. Further, replicas may have anti-affinity on zone levels, such that each replica may run in different zones. A replica set may have multiple nodes with data and, optionally, an arbiter node. One of the data bearing nodes for a database 208 may be identified as a primary node, with the others identified as secondary nodes, with writes going through the primary node.

Furthermore, resource data within database 208 may include additional constraints, also referred to as tags and/or labels, to provide flexible use of the data. A tag may define a constraint of the resources such as a type of host, environment type, encryption, etc. For example, a host type may be tagged as a general host for use by any system or it may be tagged as a specific use host to be used in specific applications. As another example, a host may be tagged as an encrypted host, that encrypts all data stored thereon, or as a non-encrypted host. The information within the tags may be provided by CVI tables 212 or by the resource itself. The tag may be stored in database 208 in any suitable manner. In some examples, the tags may be stored as a key-value pair.

Returning to operation of the VPS 206, given the constraints, the resource usage, and the limit data received from the database 208, the VPS 206 may determine an optimal placement of the newly requested volume(s) (i.e., from the received specification). An optimal placement of the requested volume may be determined from a storage perspective and/or a customer experience perspective. From a storage perspective, the placement of the volume may utilize storage resources efficiently and spread the usage across multiple storage resources and/or nodes (including across clusters where applicable). From a customer service perspective, the volume placement may meet the customer requirements as well as be responsive. Further, the VPS 206 may make the determination while taking into account the headroom for the resource(s), such as to not exceed it.

Upon making a determination of volume placement, the VPS 206 may send a message to the CVS 204 identifying the optimal placement location for the requested volume(s) (e.g., one volume, or multiple volumes such as in a group). The payload of the message may include information about where to place the volume(s), whether to create a new storage virtual machine, OS cluster information, node information, and aggregate information as determined by the VPS 206. The CVS 204 may, in response, create the requested volume(s) (and, where appropriate, any storage virtual machine). The CVS 204 may provide a response to the requestor via the proxy 202 (e.g., to the customer 104, 105 via cloud system 106 or directly to customer 104, 105, etc.). In some examples, the response to the requestor may be sent before the volume placement is completed (but information to create the volume is persistently stored somewhere that can be recovered should a failure occur), or sent after the volume placement is completed. In some examples, the CVS 204 may save the placement location to a data store (e.g., database, file, etc.) and provide a response to the requestor without creating the volume. The CVS 204 may use the saved placement location for a future request to create the volume without requesting a new placement location from the VPS 206.

While these operations are occurring (and before and/or after them), the resource tracker (RT) 210 may query each resource 214 for its current usage. In some examples, the RT 210 may query the CVI tables 212 to request information about all available resources, such as one or more resources $214_a$-$214_d$ that relate to one or more resources unique to one or more clusters on the network, such as for example, one or more storage platforms 102 and one or more cloud systems 106. The resource information provided by the CVI tables 212 may include resource location, address, type (e.g., cloud computing cluster and/or OS cluster information, more generally storage resource usage information), and any tags associated with the resource.

While the use of CVI tables 212 is one implementation for providing resource information for the RT 210 to track the resources within one or more clusters, other mechanisms for tracking resources are contemplated. In some examples, resources $214_a$-$214_d$ may be able to self-identify, or self-discover, by directly communicating their presence and location to the RT 210. In some examples, a software delivery engine (SDE) may provide resource information for the RT 210 to track the resources. Additionally, any mechanism that gives the RT 210 knowledge of the resources $214_a$-$214_d$ and the ability to query usage information from the resources $214_a$-$214_d$ is suitable for the purposes of this disclosure. Generally, the RT 210 may know which clusters are connected to each network and which resources are within each cluster.

Given the information from the CVI tables 212, or other discovery mechanism, RT 210 may then query each resource 214 for its current usage to store in database 208. This includes OS resources unique to the storage platform 200. The RT 210 may further query other resource 214 endpoints, such as a cloud volumes network resource (e.g., a module that holds network information for certain cloud provider deployments such as AWS or GCP—more generally, an endpoint that RT relies upon) for network information including usage and limit information. The RT 210 may further query other resource 214 endpoints, such as a direct attach resource provider (e.g., a module that holds network information for an Azure deployment—more generally, another endpoint that RT 210 relies upon) for network information. The cloud volume network or the direct attach resource provider might not be used for respectively different public cloud deployments (i.e., if a specific cloud deployment, one or the other might be used and the remaining not included). As an example, the RT 210 may collect point in time usage from each resource and store it in database 208. In another example, the RT 210 may collect dynamic information from each resource, such as trends, and store the information in the database 208. The data received from each resource may be translated into a generic data format for storage in database 208.

The RT 210 may query each resource for usage information periodically. For example, the RT 210 may query resource $214_a$ every 5 minutes and store the results in database 208. The time between queries may be longer or shorter than 5 minutes. The time between queries may be determined to provide the most up to date and relevant usage data without adding undue burden to the storage platform 200. In other examples, the RT 210 may query each resource on demand, such as in response to a request for a volume being received. In yet other examples, the RT 210 may query some of the resources periodically, and others dynamically, in some combination. By querying resources periodically and storing the responses in database 208, the resources may use fewer compute resources to respond to RT 210 than previous methods in which each CVS 204 requested resource data for each volume change requested.

Failure Isolation and Reporting

Generally, the VPS 206 may find a location to place the newly requested volume(s). However, there may be times when the VPS 206 is unable to determine a location for placing the newly requested volume(s). For example, an empty result may be returned by the database 208 in response to the query sent by the VPS 206. An empty result from database 208 may be considered a failure to determine a location to place the requested volume(s). In some examples including multiple volumes, the result may be empty with respect to one of the volumes. In such examples, the VPS 206 may determine a placement location for the other volumes. Alternatively, the VPS 206 may fail to place all of the requested volumes based on the failure to place one of the volumes. In failure cases such as these, feedback about the cause of the failure may improve the performance of the system from a cloud storage perspective and/or a customer service perspective. From a cloud storage perspective, identifying a cause for the failure to place the requested volume may also identify portions of the cloud storage platform that can be improved. From a customer service perspective, identifying a cause for the failure to place the requested volume may allow the customer to alter the request to place the volume in a way that the new volume may be placed. For example, the volume placement request may specify a network speed. Notifying the customer that there are no locations to place the requested volume that meet the specified speed allows the customer to change the request to a different network speed.

As discussed above, the VPS 206 may query the database 208 for usage and limit data of the various resources. As part of the querying, the VPS 206 may construct a large and/or complex database query to retrieve results from database 208. The database query may include multiple smaller queries. Traditionally, a volume placement determination component, such as VPS 206, may send each of the multiple smaller queries to a database individually and receive a response for each query. The volume placement determination component may then send the next query using information from the response to the previous query. This process may allow for tracking results from each query which may aid in determining a cause for failing to find a location to place the volume. However, it is resource intensive, requiring multiple interactions between the volume placement determination component and the database which slows down the process of identifying a location to place the volume. By constructing a larger query from the smaller queries, the VPS 206 may optimize the query to improve the operation of the database and decrease the time and resources required to identify a location to place the volume. For example, VPS 206 may manipulate, or instrument, the multiple smaller queries to create the optimized query. By doing so, the overall performance of the query may be improved while the individual smaller queries may no longer function properly on their own. That is, the optimized query may allow database 208 to perform searches directly on the intermediate results without sending intermediate results to VPS 206. This may reduce communication between VPS 206 and database 208, further decreasing the time required to obtain results from database 208 and thereby improving the performance of the overall system.

For example, a MongoDB database uses aggregate pipelines that include multiple stages. Each stage may be considered an individual database query. By aggregating, or daisy-chaining, the individual stages the VPS 206 may create a pipeline that optimizes a search on the MongoDB. As another example, a MySQL database, while not using an aggregate pipeline, may accept large structure query language (SQL) queries. The VPS 206 may combine multiple queries into a large SQL query that may be optimized to utilize the intermediate results of each query to improve the operation of the database. These are only examples of possible uses of the embodiments of the present disclosure and are not meant to be limiting.

Using an optimized query, such as those described above, may improve the performance of the overall system by allowing database 208 to provide final results to VPS 206 in a shorter period of time. This in turn may allow VPS 206 to determine an optimal placement location in a shorter period of time. Because a location to place the volume is returned most of the time, there is an overall improvement to the performance of the system. However, using an optimized query may remove visibility of a cause for the results returned by database 208 being empty. That is, the query is optimized to return a list of possible locations to place a volume, for example, and an empty result indicates that no locations were found. An empty result does not provide any information as to why a location was not found. Because the ability to track the intermediate results, as discussed above, has been removed by the optimized query, the ability to determine a cause for the failure is reduced.

In order to address this issue and determine a cause for the empty results, the VPS 206 may deconstruct the optimized query into a plurality of queries. This deconstruction allows for a replay of the optimized query in a controlled manner in such a way that VPS 206 may receive additional information to determine the cause for the failure to identify a location. For example, the aggregate pipeline of the MongoDB may be deconstructed into individual stages. As another example, the SQL query may be deconstructed into a plurality of queries. These individual stages, or queries, may then be sent, in an iterative manner, to the database 208 to determine a cause for the empty results from database 208.

For example, the optimized query may include four separate queries. In some embodiments, the four queries may be four stages that are part of an optimized aggregate pipeline to be sent to a MongoDB. In some other embodiments, the four queries may be four SQL queries that are included in an larger, optimized SQL query. It is understood that there may be more than four queries and that the various embodiments of the present disclosure may use any number of queries, or stages (and with respect to any of a variety of database architectures and structures). The VPS 206 may modify the four individual queries to construct the optimized query. In some embodiments, the VSP 206 may temporarily store the four individual queries in a data structure to be used in case the database 208 returns an empty result. The VPS 206 may send the optimized query to the database 208 and receive a result. When the result from database 208 is not empty, the VPS 206 may determine an optimized placement location according to embodiments discussed above and below. However, when the result returned from database 208 is empty, the VPS 206 may determine a cause for the empty results.

The VPS 206 may deconstruct the optimized query into a plurality of queries. In some embodiments there may be four queries in the plurality of queries. In some other embodiments, there may be more or fewer queries in the plurality of queries. The plurality of queries may represent different levels of database search that filter the information stored in database 208. For example, database 208 may have a hierarchical structure that correlates to the hierarchy of the network. The network hierarchy may include, starting at the largest possible set of objects, a hyperscaler cluster level (e.g., cloud level), a stamp level (e.g., collection of operating clusters), an operating cluster level (e.g., filesystem/storage operating systems in general), a node level, and an aggregate level. Other levels, such as more or fewer, may be included according to aspects of the present disclosure. As an example, a first query may filter the information in the database at the cloud computing cluster level (e.g., hyperscaler cluster level) and select one or more cloud computing clusters that satisfy the requirements of the volume placement request. An example of filtering the cloud computing cluster level is filtering out explicitly disabled cloud computing clusters. As another example, cloud computing clusters having stale information stored in database 208 may be filtered out. As a further example, cloud computing clusters that do not satisfy a proximity requirement included in the create volume request may be filtered out. Additionally, VPS 206 may filter out cloud computing clusters that CVI 216 does not know about.

Continuing with the example, a second query may filter the selected cloud computing clusters (i.e., those selected at the hyperscaler cluster level) at the operating cluster level to select one or more operating clusters that satisfy the requirements of the volume placement request. An example of filtering the operating cluster level may be filtering out operating clusters having stale information stored in database 208. Another example may be filtering out operating clusters that have been explicitly disabled or those that have an older version number. As another example, operating clusters not known by CVI 216 may be filtered out. Additionally, operating clusters that do not have the necessary resources may be filtered out.

A third query may filter the selected operating clusters (selected at the operating cluster level) at the node level to select one or more nodes that satisfy the requirements of the volume placement request. For example, nodes that have stale information stored in database 208 may be filtered out of the possible locations to place the volume. Other examples of nodes to filter include nodes that are explicitly disabled, nodes that are not members of the previously selected operating clusters, and nodes that are excluded from consideration based on the original request. Further examples include filtering out nodes that do not have enough throughput headroom to support another volume and nodes that do not have enough general resource headroom to support another volume.

A fourth query may filter the selected nodes at the aggregate level to select one or more aggregates that satisfy the requirements of the volume placement request. For example, aggregates that have stale information in database 208 may be filtered out. As another example, similar to above, aggregates that have been explicitly disabled, aggregates that are not online, and aggregates that are explicitly excluded in the original request may be filtered out. Additional examples of when to filter out aggregates may include filtering out aggregates that are not currently on their home node, aggregates that do not have enough physical logical space for the requested volume, and aggregates that do not have enough physical space for the requested volume.

This is a simplified example of how the different queries, or stages, may interact and how filtering at each level may occur. Each level of filtering, or selecting, may be more complicated based on the volume placement request. It is understood that the above is exemplary and not intended to limit the scope of this disclosure. The hierarchy of database 208 and/or the hierarchy of the network may include more or fewer levels than those presented above. It is understood that filtering the information in database 208 may include filtering the information at one or more of the hierarchy levels within database 208.

After deconstructing the optimized query, the VPS 206 may enter a loop and iterate over the plurality of queries. In a first iteration, the VPS 206 may select the first query of the plurality of queries to send to database 208. The VPS 206 may receive results back from database 208 in response to the first query. If the results are empty, the VPS 206 may determine a cause for the failure to determine a location to place the volume (e.g., the empty results of the optimized query). As will be described in further detail below, to make this determination the VPS 206 may replay an optimized query that fails to provide a location. VPS 206 may log details during the replay from the first query until the query that filters out the remaining candidates resulting in the failure. Each log message may have a correlation ID associated with a create volume request so that the log details can be associated with a specific create volume request. While the queries run after a failure may not be identical to the corresponding portion of the optimized query, they are close enough to determine a cause for the failure to find a location to place the volume. VPS 206 may analyze the log details and determine, based on the log details from each query, a cause for the failure to place the volume.

The VPS 206 may respond to the volume placement request with an indication of the cause for the empty result. In some examples, the indication may be an error code that may be mapped to a constraint selected by the user. In other examples, the indication may provide more information about the cause of the error. For example, VPS 206 may respond to the request to place the volume with an error code combination including major code, a minor code, and detail flags. An example of an error code may be "2:8:C". The major code, "2" in this example may provide location in the object hierarchy where the last failure happened (e.g, hyperscaler cluster, stamp, host (such as operating cluster objects), node (such as controller objects), aggregate, SVM, generic (e.g., failures that don't tie to a single object type, such as a reservation failure)). Each location may identify at what level of the network hierarchy, and therefore database hierarchy, the failure occurred. The generic code may be used for errors and/or failures that are not tied to a specific object. Some examples of a generic error include a server error and a reservation error.

The minor code, "8" in this example, may provide an indication of what "step" in the filter pipeline for the major code object failed. The minor code may provide information about why the last candidate(s) were eliminated. For example, the minor code may indicate that the candidates were explicitly disabled or that the candidates were explicitly excluded by the original request constraints. As another example, the minor code may indicate that the candidate does not satisfy the network connectivity requirements of the request, the network proximity requirements of the request, and/or the physical availability zone of the request. Further examples include configuration errors and/or insufficient resources. In some examples, any minor code may be returned for any major code. In some other examples, not all minor codes may be returned for each major code.

Detail flags may be a set of flags, where each specific bit corresponds to a specific expected detail string. In the above example the details flag is "C" which may be a hexadecimal representation of binary "1100" indicating that two detail flags are set. Each detail string may correspond to a specific type of error and/or failure associated with the minor code. Some examples of detail strings include hyperscaler drop count, host group, node ungroup, node volume count, node count, aggregate logical size, and aggregate physical size. As is seen by the type of detail string, the detail flag is specific to a minor code. In some examples, the detail string is unique to a major code and minor code combination. For example, a minor code may use more than one detail string to further clarify the nature of the failure. A zero encoded in the detail flags may indicate that no details are present. Providing error coding using major code, minor code, and detail flags allows support personnel to interpret the cause of the error. Additionally, VPS 206 may provide the error code to CVS 204 to translate to a human readable error that may be presented to an end user.

Some common combinations of major/minor codes are now presented by way of some examples. The examples presented may provide certain strings, which are to be understood as exemplary for the manner in which to present the code. Other strings or combinations of data may be used to accomplish the same effect for major codes, minor codes, and flags.

For example, for any major code, a common minor code may be "stale_information," which means that the usage information in the database is not up to date. This may indicate, for example, that something is incorrect in the refresh pipeline. Another common minor code may be "server_error," a catch-all error for any placement failures that are not tied to resource checking. This may refer to all other failures such as inability to read from the database, unexpected data in the database, or other coding for I/O errors. In general, details of this failure may be illuminated by consulting the logs. Another common minor code may be "missing_information," which may occur if usage information cannot be found in the database pointed to by a higher level object. Some examples of this may include being unable to find usage information for child stamps of a hyperscaler cluster, or child nodes of an operating cluster, etc.

There are some common major/minor code combinations associated with the hyperscaler major code. The hyperscaler major code may indicate that all hyperscaler clusters were filtered out during an allocation attempt. The minor codes commonly associated with this major code may inform why the last candidates were eliminated. A common minor code associated with this major code may include "explicitly_disabled," which identifies that candidates were explicitly_disabled by operations. Another common minor code may include "explicitly_excluded," which identifies that candidates were explicitly_excluded by VDS constraints. Another common minor code may include "network_proximity" which may identify candidates that did not satisfy the network proximity requirements specified in the VDS. The returned details may include the specific "network_proximity" tag that is expected to be present on the hyperscaler cluster for it to be considered, for example "t2alias." Another common minor code may include "network_connectivity" which may identify candidates did not satisfy the network connectivity requirements specified in the VDS. The returned details may include the set of connectivity requirements specified, such as for example, "sdnAppliance: T1." Another common minor code may include "availabilty_zone" that may identify candidates that are not part of the required physical availability zone. The returned details may include the zone that was needed, for example "1." Another common minor code may include "configuration_error" that may indicate that there is usage data for a hyperscaler cluster that is not known by CVI 212. This might be a temporary mismatch between the CVI 212 and database 208. The returned details may be an indication of a missing configuration. Another common minor code may include "insufficient_resources" that may identify candidates did not satisfy hyperscaler usage limit checks. The returned details may include the superset of resources that were over limit and so caused the particular candidate to be eliminated. Note that different candidates may be eliminated for different reasons. The different reasons may be identified by a detail flag. Possible detail flag values may include string values indicating a specific reason for failure such as "hyperscaler_cluster_cvn_tenancy_count," "hyperscaler_cluster_drp_vrf_count," and "hyperscaler_cluster_drp_route_count."

The stamp major code may indicate that all stamps were filtered out during an allocation attempt. The minor codes commonly associated with this major code may inform why the last candidates were eliminated. A common minor code associated with this major code may include "configuration_error" that may indicate that there is usage data for a particular stamp that is not known by CVI 212. This might be a temporary mismatch between CVS 212 and database 208. The returned details may be an indication of the missing configuration.

The host major code may indicate that all hosts (e.g., operating clusters) were filtered out during an allocation attempt. The minor codes commonly associated with this major code may inform why the last candidates were eliminated. A common minor code associated with this major code may include "required_device_unavailable" that may indicate that the requested host is not available. This can happen if the VDS specifies a SVM to use but the host that the SVM is on is unavailable for a higher level reason such as the parent hyperscaler cluster not being available. Another common minor code associated with this major code may include "configuration_error" that may indicate that there is usage data for a host that is not known by CVI 212. This might be a temporary mismatch between CVI 212 and database 208. The returned details may be an indication of the missing configuration. Another common minor code associated with this major code may include "explicitly_disabled" that may indicate that the remaining host candidates have been explicitly_disabled by operations. Another common minor code associated with this major code may include "device_wrong_state" that may indicate that the remaining host candidates are running a software version that does not support the requested placement. Another common minor code associated with this major code may include "explicitly_excluded" may indicate that the remaining host candidates were excluded as per the VDS. Another common minor code associated with this major code may include "feature_explicitly_disabled" that may indicate that the remaining host candidates were labeled in such a way that they were excluded as per the VDS. The details section may contain the superset of labels that caused the exclusion. It should be noted that different candidates may be eliminated because of different labels. Another common minor code associated with this major code may include "insufficient_resources" that may identify candidates did not satisfy host usage limit checks. The returned details may include an indication of the resources that were over limit and so caused the particular candidate to be eliminated. It should be noted that different candidates may be eliminated for different reasons. The different reasons may be further identified using one or more detail flags. Possible detail flags may include "host_cluster_ipspace_count," "host_cluster_vlan_count," "host_cluster_svm_count." Another common minor code associated with this major code may include "affinity_constraint" that may indicate a failure during affinity checks for a set of aggregates in a volume group placement. Depending on the VDS, the details flag may include one or both of "host_group" and "node_ungroup." Note that the detail values may indicate what was specified in the VDS and may not give the exact reason for the affinity failure.

The node major code may indicate that all nodes were filtered out during an allocation attempt. The minor codes commonly associated with this major code may inform why the last candidates were eliminated. A common minor code associated with this major code may include "explicitly_disabled" that may indicate that the remaining node candidates have been explicitly disabled by operations. Another common minor code associated with this major code may include "device_wrong_state" that may indicate that the last remaining node candidates were in the wrong state to be used. This may happen if a node is not part of the host. Another common minor code associated with this major code may include "explicitly_excluded" that may indicate that the remaining node candidates were excluded for consideration as per the VDS. Another common minor code associated with this major code may include "insufficient_resources" that may identify candidates that did not satisfy node usage limit checks. The returned details may include an indication of resources that were over limit and so caused the particular candidate to be eliminated. It should be noted that different candidates may be eliminated for different reasons. The specific reasons for eliminating the different candidates may be identified using detail flags. Possible detail flags may include "node_volume_tag_count_xxx" where "xxx" indicates the full tag name that failed (e.g., "node_volume_tag_count_SAPHANA-data"). Other possible detail flags may include "node_mibps_throughput," "node_data_lif_count," "node_dp_volume_count, "node_volume_count," and "node_count."

The aggregate major code may indicate that all aggregates were filtered out during an allocation attempt. The minor codes commonly associated with this major code may inform why the last candidates were eliminated. A common minor code associated with this major code may include "explicitly_disabled" that may indicate that the last remaining aggregate candidates were disabled by operations. Another common minor code associated with this major code may include "device_wrong_state" that may indicate that the last remaining aggregate candidates were in the wrong state to be used. This may be because the aggregate was not on its home node, or because the aggregate is offline. Another common minor code associated with this major code may include "explicitly_excluded" that may indicate that the last remaining aggregate candidates were explicitly_excluded as per the VDS. Another common minor code associated with this major code may include "required_device_unavailable" that may indicate that the last remaining aggregate candidates were eliminated because they did not match the requested aggregates as per the VDS. Another common minor code associated with this major code may include "insufficient_resources" that may identify candidates did not satisfy node usage limit checks. The returned details will include an indication of which resources were over limit and so caused the particular candidate to be eliminated. It should be noted that different candidates may be eliminated for different reasons. The specific reasons for eliminating the different candidates may be specified by the detail flags. Possible detail flag values may include "aggregate_logical_size" and "aggregate_physical_size, aggr_count."

The SVM major code may indicate that all SVM candidates were filtered out during an allocation attempt. The minor codes commonly associated with this major code may inform why the last candidates were eliminated. A common minor code associated with this major code may include "explicitly_disabled" that may indicate that the last remaining SVM candidates were disabled by operations. Another common minor code associated with this major code may include "insufficient_resources" that may identify candidates did not satisfy node usage limit checks. The returned details may include an indication of resources that were over limit and so caused the particular candidate to be eliminated. It should be noted that different candidates may be eliminated for different reasons. The reasons for eliminating the different candidates may be enumerated using detail flags. Possible detail flag values may include "svm_volume_count."

The generic major code may indicate a generic error that may not be tied to a specific usage hierarchy type. The minor codes commonly associated with this major code may inform why the last candidates were eliminated. A common minor code associated with this major code may include "server_error" which may be a catch all error for any placement failures that are not tied to resource checking. That is, all other failures such as inability to read from the database, unexpected data in the database, or other coding for IO errors. The logs may provide further details about the specific error. Another common minor code associated with this major code may include "reservation" that may indicate a failure to make a reservation for a volume allocation.

The above provides some examples of what type of error code may be provided in response to the first query, when the first query still provides an empty result. However, if the results returned from the database 208 are not empty, the VPS 206 may not be able to determine the cause of the original empty result and may continue with another iteration. This corresponds to a situation where the original error did not arise from operations related to the first query.

In a second iteration, the VPS 206 may select the second query and combine it with the first query to form a combined query. The VPS 206 may send the combined query to the database 208. Database 208 may respond to the combined query with results. Again, if the results are empty, the VPS 206 may determine a cause for the failure to determine a location to place the volume (as discussed in the example above). If the results are not empty, the VPS 206 may proceed with another iteration.

In a third iteration, the VPS 206 may combine the first query, the second query, and the third query to form a combined query. This new combined query may be sent to the database 208. As before, the VPS 206 may determine whether or not the results returned by database 208 are empty and proceed accordingly. The VPS 206 may continue this process with successive iterations until either the database returns an empty result, or all of the plurality of queries are included in the combined query. The VPS 206 may use the results of each iteration and the individual queries to determine a cause for failure to place the requested volume. The determination may include analyzing the results received from the database 208 in combination with each of the plurality of queries to determine a cause of the failure, as described in the example above.

As mentioned above, VPS 206 may respond to the request for volume placement and include an indication of the cause for the failure to place the requested volume. In some embodiments, the user (e.g., customer 104, 105) may modify the request for volume placement based on the returned error. For example, the original request may have specified that the volume be placed on a node having a specific high-speed network connection. However, the error code may indicate that the placement failed because of the request for the specific high-speed network. The user may then modify the request for volume placement to request a lower speed network.

The system may automatically take additional actions to place the volume with modifications to the request in response to the determined error. In some embodiments, VPS 206 may modify the original request for volume placement to avoid/resolve the error. VPS 206 may modify the search queries to identify a location to place the volume that is compatible with the original request. For example, if the error indicates that a suitable node connected to the requested high-speed network was not found, VPS 206 may search for nodes connected to a network that is comparable to the requested network. By modifying the search to include acceptable alternatives, VPS 206 improves the overall performance of the system by quickly providing a location to place the requested volume.

In some other embodiments, VPS 206 may provide the error or an indication for the failure to place the volume to CVS 204. CVS 204 may modify the original request for volume placement in response to receiving the error or indication of the cause of failure received from VPS 206. The modified request for volume placement may use suitable alternatives for the volume placement constraint that prompted the error. Some examples of suitable alternatives include system default alternatives and user approved alternatives. CVS 204 may send the modified request for volume placement to VPS 206. Additionally, CVS 204 may send an indication of the change in volume placement request along with the original indication for the cause of error to the original requestor. Alternatively, CVS 204 may respond to the original volume placement request with a location to place the volume based on the modified volume placement request and the error provided by VPS 206.

Automatically modifying the request for volume placement may improve the performance of the system from a cloud storage perspective and/or a customer service perspective. From a cloud storage perspective, automatically modifying the request for volume placement reduces the number of interactions between the system and the user which improves the speed at which the volume may be placed. From a customer service perspective, automatically modifying the volume placement request in response to the error reduces the amount of work required by the customer. Additionally, the volume may be placed and be ready for use in less time than previously possible.

In some examples, the database 208 may return results in response to the combined query including the plurality of queries. The combined query may be constructed to provide results similar to those provided by the optimized query. In some embodiments, the combined query may be the same as the optimized query. In some embodiments, the combined query may be different than the optimized query. In cases where the optimized query did not return results, but the combined query did, the VPS 206 may use the results of the combined query to determine a location to place the volume as described above and below. Further details related to failure isolation and reporting are discussed further below with respect to FIGS. 4B, 5, 7, and 8.

Volume Placement Scoring

As also discussed above, the VPS 206 may determine which of the locations returned from the series of database queries to suggest for the newly requested volume(s) based on a variety of parameters. In addition to those listed above and further below, the VPS 206 may further implement a scoring scheme, or scoring function, to determine the optimal placement of the newly requested volume(s). The scoring scheme may include a weighted function which places different weights, or scores, on the different parameters of the potential locations that support the requested set of requirements based on a predetermined priority.

For example, if the specification provides a minimum throughput, the resources may be ranked based on throughput with the resource having a higher throughput receiving a higher score, or weight. While the resource having a higher throughput may receive a higher score, that resource may ultimately not be chosen as the location because of the other parameters specified in the request. As another example, if the specification does not require encryption then resources without encryption may receive a higher score but a resource having encryption may still be selected. This may help to keep the encrypted resources free for volumes requiring encryption, while still allowing the volume to be placed on the encrypted resource if a suitable non-encrypted resource is not found. The scoring scheme may take into account a variety of parameters, such as the examples of constraints noted previously, including for example one or more of different types of storage hardware and corresponding limits, different capabilities and limits supported by different storage software versions, different networking hardware and corresponding limits, different capabilities and limits supported by networking hardware, sharing of the storage and networking infrastructure by multiple customers and workloads, application specific requirements (e.g., two volumes to not be hosted on the same storage hardware, volumes should be hosted with specific latency requirements, and/or other limitations or requirements).

Referring again to FIG. 2A (and/or 2B, discussed further below), the VPS 206 may include multiple different scoring schemes. A default scoring scheme may be set by the VPS 206. The specification (e.g., VDS) may indicate which scoring scheme to use. In some examples, a list of available scoring schemes may be published for use by the CVS 204 when creating a request. In some examples, the scoring scheme may be a plugin that can be updated by the CVS 204. That is, the CVS 204 may create a new scoring scheme and select the new scoring scheme to be used in determining the optimal location. The scoring scheme allows the VPS 206 to determine an optimal placement location in a flexible, and extendable, manner.

Database 208 may be designed to work with the algorithms used by the VPS 206 to improve access to the stored usage data. Such designs may improve overall efficiency of the storage platform, reduce latency in determining an optimal placement, and improve maintainability of the database 208. For example, database 208 may store the usage data of each resource in a hierarchical manner based on the where the resource exists within the various storage platforms 102 or cloud systems 106. That is, the database 208 may separate the resource usage data based on the topology of the networks, clusters, and systems. In some examples, the data may be separated by cluster level, operating system level, node level, storage virtual machine (SVM) level, aggregate level, etc.

This may improve overall efficiency of the VPS 206 by allowing the VPS 206 to filter out a resource, including all lower level resources, that do not meet the requirements of the volume request. For example, when making a determination for volume placement the VPS 206 may be able to exclude entire clusters that do not meet the requested requirements without having to check each individual resource within the excluded cluster. The VPS 206 may filter out the resource before applying the scoring function. The remaining resources contain all of the information needed for applying the scoring scheme so the VPS 206 may apply the scoring without another database query. Furthermore, this may improve the maintainability of database 208, allowing for the addition of new functionality with little to no effect on the current data. Designing database 208 as discussed above may improve the speed and efficiency with which the VPS 206 is able to determine the optimal placement of the requested volume(s). Experimentation has shown this design to be remarkably efficient when handling a large amount of unique volume requests.

Volume Deployment Specification

As noted previously, the communication between the CVS 204 and the VPS 206 may occur via a volume deployment specification (VDS). The VDS may be a mechanism for decoupling volume deployment requirements from the underlying storage installations (e.g., cloud provider environment 100 and storage platform architecture 200). As such, the VDS may be considered an extensible language for use in describing, understanding, and making volume placement decisions. The VDS may be implemented using JSON, XML, YAML, or any other data format.

The VDS language provides a framework for defining rules and constraints for placing volumes within multiple heterogeneous storage systems. For example, the schema of the VDS may provide an ability to specify an operating system cluster type to consider/ignore when creating a volume, an ability to specify a list of storage virtual machines to consider when placing a volume, an ability to support multiple volume placement in a single call, and/or an ability to specify affinity/anti-affinity between volumes, as some examples. The VDS may contain a set of constraints to place a volume, filter(s) for volume selection and/or scoring based on certain criteria among a candidate list, etc. Examples of volume placement constraints include requesting two specific volumes together into a single node, requesting that a specific volume go into a specific cluster that is dedicated to a customer, and requesting that a specific volume only go on a network switch that has a specific capability.

The VDS may include several fields. For example, where an incoming request is for placement of two volumes, V1 and V2 (in this example), that request may include several requirements including: V1 and V2 should be placed in a same stock keeping unit (SKU, e.g., a SAP HANA SKU), V1 and V2 should not be placed in the same OS controller (node), V1 requires X capacity and Y throughput, V2 requires W capacity and Z throughput, and V1 and V2 should be part of the same T-carrier (e.g., T2) network. This is just by way of example to illustrate. With these requirements, the VDS that packages these requirements (e.g., as provided from the customer's request via the cloud system 106) may be packaged in a schema as follows:

```
{
  "volumeGroups": [
    {
      "groupid": "GroupUUID1",
      "constraints": {
        hyperscalerCluster": {
          "requires": {
            "networkProximity": "T2Alias"
          }
        },
        "operatingsystemCluster": {
          "requires": {
            "label": ["operatingsystemClusterType":"SKU1"]
          }
        },
        "node": {
          "unGroupVolumes": [
            ["V1-AllocationUUID", "V2-AllocationUUID"]
          ]
        }
      },
      "volumes": [
        {
          "volumeAllocationUUID": "V1-AllocationUUID",
          "mandatory": "true",
          "resource": {
            "capacity": "XGb",
            "throughput": "YMbps"
          }
        },
        {
          "volumeAllocationUUID": "V2-AllocationUUID",
          "mandatory": "true",
          "resource": {
            "capacity": "WGb",
            "throughput": "ZMbps"
          }
        }
      ]
    }
  ]
}
```

This is by way of one example only, for purposes of illustration of what a VDS example may look like upon packaging the details of a request from a customer 104, 105. As can be seen in this example, the requirements are packaged in the VDS with the parameters requested, with constraints listed and allocation details of the two volumes V1 and V2 listed. Although the above example is implemented in JSON other formats are contemplated such as, for example, XML, YAML, etc.

As illustrated in the VDS example above, the VDS includes reserved keywords, labels, values, objects, arrays, and units of measurement. Reserved keywords in the example above include "volumeGroups," "groupid," "constraints," "hyperscalarCluster," "requires," "node," "operatingsystemCluster," etc. The reserved keywords form the core of the VDS language, allowing CVS 204 to communicate to VPS 206 the requirements for placing volumes within multiple heterogeneous storage systems. In the example above, the reserved keyword "volumeGroups" indicates a request for locations to place one or more groups of volumes. In this example, there is only one volume group to be placed which may be referenced by the value of the reserved keyword "groupid." In other examples, there may be more than one group of volumes included in the request. Each volume group may include its own unique "groupid." The reserved keyword "constraints" provides additional information about the volume placement request, such as requirements for the type of hyperscaler cluster (e.g., cloud system 106), the requirements for the type of operating system cluster (e.g., storage platform 102), and the requirements for placement on nodes within the operating system cluster. The VDS defines the volumes to be created under the reserved keyword "volumes." In this example, there is an array of two volumes identified as "V1-AllocationUUID" and V2-AllocationUUID." The example VDS defines these volumes as part of a volume group where the group placement includes the requirements defined by the reserved keyword "constraints."

In the above example, the VDS indicates, using the "node" reserved keyword, that the volumes represented by "V1-AllocationUUID" and "V2-AllocationUUID" are to be placed on separate nodes by using the reserved keyword "unGroupVolumes." Furthermore, the VDS makes use of labels, or key-value pairs, to indicate the types of hyperscalar clusters and operating system clusters to use. Labels, also referred to as tags, provide flexibility within the VDS language because they may not need to be defined in VPS 206 for them to be used by VPS 206. In this example, the label "operatingsystemClusterType": "SKU1" may be known by CVS 204 but not known by VPS 206. However, VPS 206 may use labels to identify a suitable location for the requested volumes based on the labels. The information retrieved from the database 208 by VPS 206 may include the labels. These may be used for comparison without needing to understand the context of the labels.

Figure 2B:
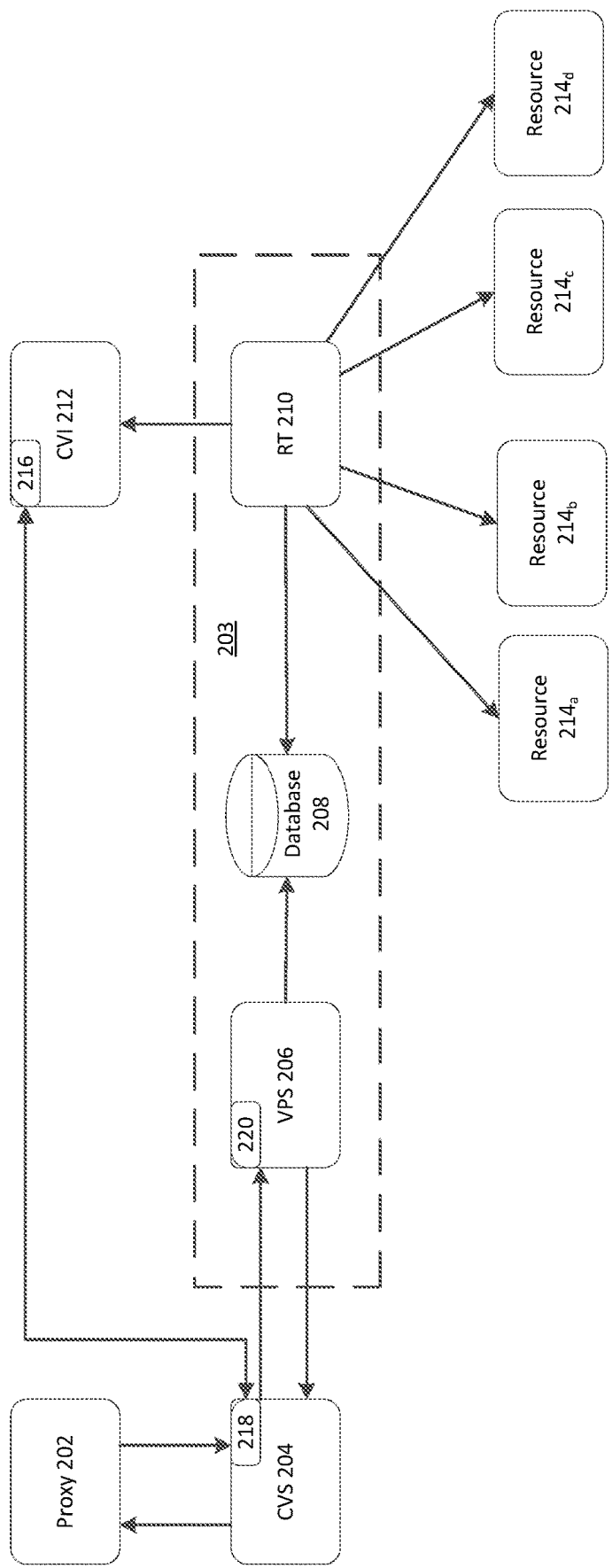

FIG. 2B illustrates additional components of the architecture 200, to aid in the discussion of the VDS, including a label database 216 as part of CVS tables 212, a serviceability engine 218 as part of CVS 218, and an interpreter 220 as part of VPS 206. Label database 216, serviceability engine 218, and interpreter 220 are illustrated as distinct components for illustrative and discussion purposes. For example, label database 216 may not be distinct from the other data stored in CVI tables 212, serviceability engine 218 may be wholly integrated into CVS 204, and interpreter 220 may be wholly integrated into VPS 206.

The information stored in the CVI tables 212 may further include labels (e.g., key-value pairs) in label database 216 to be used by the CVS 204 in creating the volume placement request using the VDS. In some examples, an implementation other than CVI tables 211 may be used to store the labels associated with the different resources 214$_a$-214$_d$. The labels from label database 216 may be retrieved by RT 210 and stored in database 208 along with the usage information. In some examples, RT 210 and database 208 may store the labels without context or understanding of the meaning of the labels.

The serviceability engine, or translator, 218 within CVS 204 may have access to the labels database 216 of CVI tables 212. Translator 218 may use the labels from the labels database 216 in creating the VDS request to be sent to VPS 206. The translator 218 may translate the request from proxy 202 into the abstracted, or generic, format of the VDS. This process decouples the client request for volume placement from the underlying implementation. In some examples, one or more CVS 204 may each receive a request for volume placement from different proxies 202 using different APIs than the other CVS 204. Translating the request into a VDS request may reduce the work required by VPS 206 and improve the efficiency of the storage systems. The abstracted format of the VDS may streamline processing by VPS 206 by not requiring VPS 206 to provide and maintain multiple APIs for request volume placement. CVS 204 may then send the VDS to VPS 206.

Interpreter 220 may receive the VDS request from CVS 204. Interpreter 220 may interpret, or parse, the VDS to extract the information. The extracted information may include reserved keywords, labels, and values associated with each. VPS 206 may use the information from the VDS to determine a location to place each of the requested volume. VPS 206 may match labels included in the VDS with labels stored in database 208. This filtering and matching based on labels, without requiring context or understanding, may allow VPS 206 to place volumes on new types of resources with little to no changes to the code of VPS 206.

FIG. 2B illustrates one example of the interactions between the various components of the storage platform architecture 200 when creating and using a VDS volume placement request, such as the request illustrated above. This illustrates the flexibility of the VDS language in requesting one or more locations for placing volume(s) within multiple heterogeneous storage systems. Another example of a request is provided below to further illustrate the flexibility of the VDS language. In this example, placement for a single volume is requested. The volume requires X capacity and Y throughput. This example request may be packaged in a schema as follows:

```
{
"capacity":"XGb",
"throughput":"YMbps"
}
```

This is by way of another example to illustrate the flexibility of the VDS language. This example request includes the absolute minimum required information for placing a volume, the storage capacity (e.g., "capacity") and the performance (e.g., "throughput"). In this example, the VDS indicates a request to place one volume having X Gb storage capacity and Y Mbps throughput. As there are no other constraints, VPS 206 may suggest any location that satisfies those two requirements. As seen in these two examples of volume placement requests using the VDS language, the VDS language may efficiently request a single volume with no constraints as well as request the placement of a group of volumes. The VDS language provides the necessary syntax to request placement for any combination of volumes. The flexibility of the VDS language improves the efficiency of communicating volume placement requests and the efficiency of identifying a location. Additionally, the VDS language is highly extensible with little to no code changes on the backend (e.g., VPS 206). Generally, when a new requirement or constraint is desired, a new label (e.g., key-value pair) can be added in the VDS.

Figure 3:
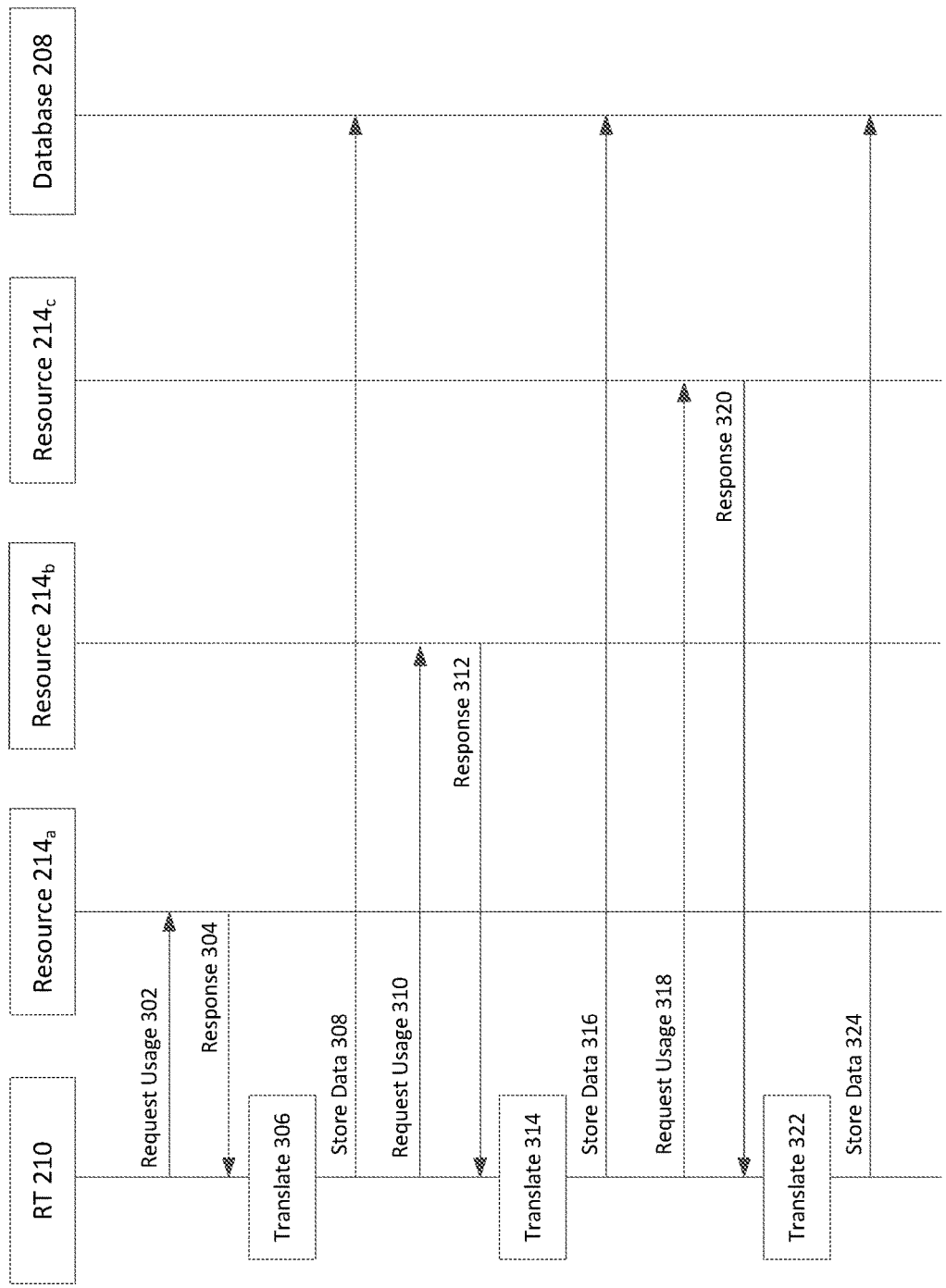
FIG. 3 illustrates an exemplary process flow for resource tracking of multiple resources according to some embodiments of the present disclosure.

Turning now to FIG. 3, an exemplary process flow 300 for tracking usage of multiple resources according to some embodiments of the present disclosure is illustrated. FIG. 3 illustrates the flow 300 between different components of a cluster, such as cluster 203/112 including a resource tracker (RT) 210, a number of resources $214_a$-$214_c$, and a database 208. Resources $214_a$-$214_c$ may be an example of storage resources, switching resources, and/or connections resources as described above with respect to FIG. 1 and FIGS. 2A/2B. RT 210 and Database 208 may be an example of the resource tracker and database, respectively, illustrated in FIGS. 2A/2B.

At action 302, RT 210 may request usage data from the resource $214_a$ (representative of an endpoint more generally). This may be in the form of a query from the RT 210 to the resource $214_a$. In some other examples, the RT 210 may further include several components, including a supervisor component and one or more worker components. The supervisor component of RT 210 may be responsible for creating one or more jobs in a central location that the one or more worker components then process. Examples of jobs (done by the RT 210 in general, or by worker components in particular) include querying CVI 212 to fetch all available resources (including cloud computing cluster and/or OS cluster resources), fetch usage from OS clusters (including, for example, usage for OS cluster and resources underneath that), and/or fetch network usage.

While the RT 210 may query (in some examples with the worker component(s)) OS cluster resources, in some examples this may result in just resource usage information. Accordingly, the RT 210 may maintain its own table (such as in database 208) for corresponding limits for the OS cluster resources. Further, RT 210 may categorize the usage and limits based on different levels of scope, such as a cloud computing cluster level, an OS cluster level, a node level, and/or an aggregate level. For each level of scope, the RT 210 may maintain limit types such as default limits and/or override limits. A default limit may refer to a limit considered by default for a given resource. When a new hardware and/or software version is introduced to the system, then this information may be added to a default limit table with the other default limits. Such default limits may be a direct representation from OS hardware, which may be defined by the OS provider. Override limits may refer to limits that may be overridden, and may include default limits as well as a few additional network-related limits. Volume placement might be kept from exceeding override limits in some examples.

Where the RT 210 includes supervisor and worker components, the supervisor component may query the database 208 to fetch a list of all OS clusters, and for each cluster create a job in the central location that respective worker components may take. The worker components may then query the usage (and limit, where available) information from the endpoints like OS endpoints or other cloud provider endpoints such as those possible discussed above.

At action 304, resource $214_a$ may respond to the request with usage data. As discussed above, in one example, the usage data may be point in time usage data. In another example, the usage data may be dynamic usage data. The usage data may be provided in the format of the specific resource type. Further, this data may be queried periodically, such as on the order of 5 minutes. The periodicity may be modified, such that querying may occur more frequently or less frequently according to configuration. The query at action 302, and response at action 304, may occur via one or more APIs exposed by the resource $214_a$ (e.g., an endpoint generally).

At action 306, the RT 210 may translate the received usage data to a generic format, such as according to a defined schema (e.g., a JSON format). The generic format may allow the usage data and/or limit data from each different type of resource to be stored in a similar manner to make the data easier to work with.

At action 308, the RT 210 may store the translated usage data from resource $214_a$ to database 208.

Actions 310-316 may be the same as actions 302-308, except that the usage data is provided by resource $214_b$ instead of resource $214_a$. Further, actions 318-324 may be the same as actions 302-308, except that the usage data is provided by resource 214 instead of resource $214_a$. Such actions may occur, for example, by the RT 210 generally, or by supervisor and worker components in particular as discussed. In some examples, actions 310-316 may occur at the same time as actions 302-308, while in other examples one may occur after the other, or in yet other examples they may partially overlap in time. Similarly, actions 318-324 may occur at the same time as actions 302-308 and/or 310-316, while in other examples one may occur after the other, or in yet other examples they may partially overlap in time.

Figure 4A:
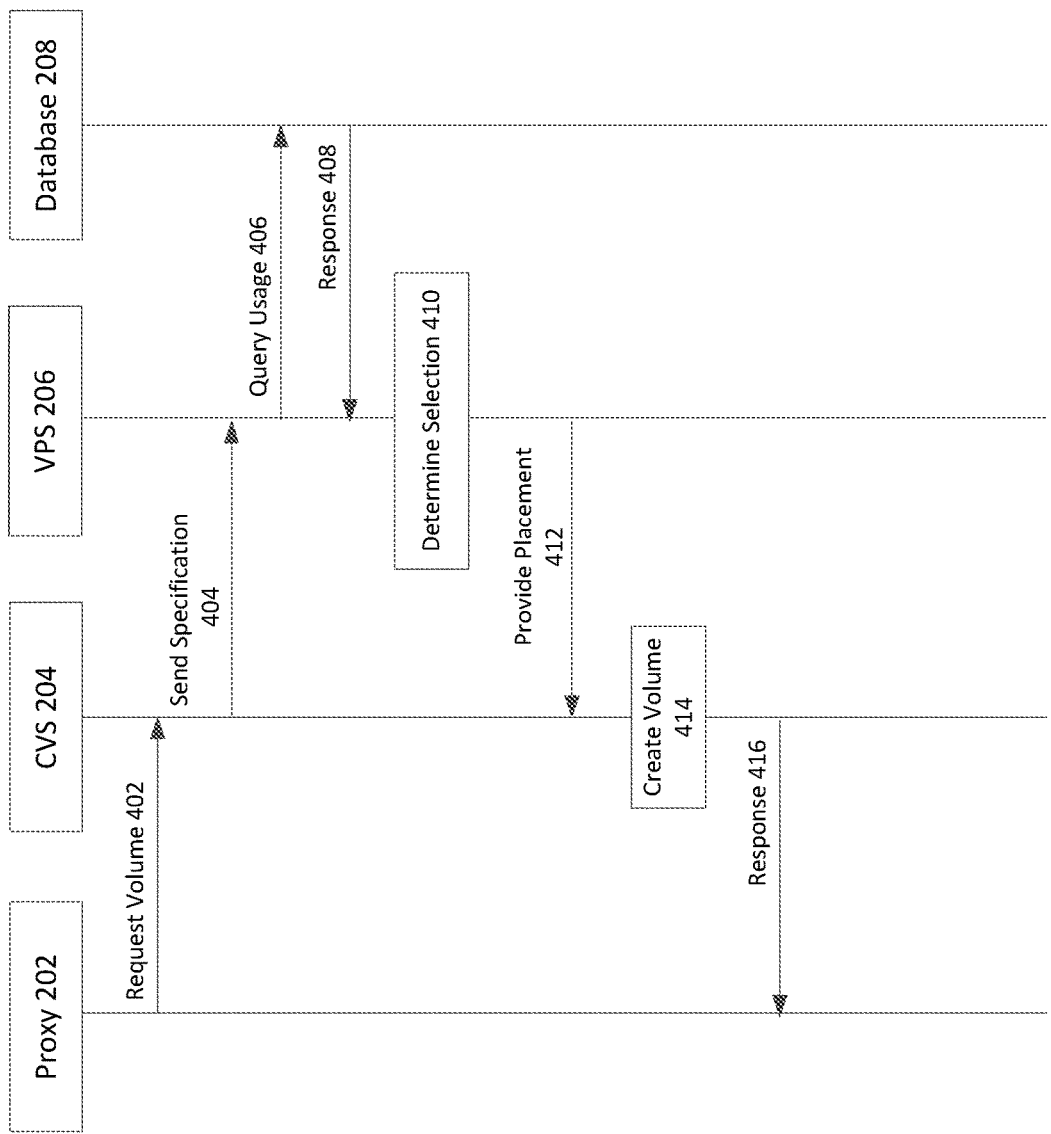
FIGS. 4A-4B illustrate exemplary process flows for volume placement selection, creation and, error handling among resources according to some embodiments of the present disclosure.

Turning now to FIG. 4A, an exemplary process flow 400 for selecting an optimal placement location for a requested volume according to some embodiments of the present disclosure is illustrated. FIG. 4A illustrates the flow 400 between different components of a storage platform 200/102 including the proxy 202, and components of a cluster, such as cluster 203/112 including the cloud volume service (CVS) 204, the volume placement service (VPS) 206, and the database 208. While described with respect to a single volume, the actions illustrated in FIG. 4A equally apply to requests to create multiple volumes at the same time.

At action 402, the proxy 202 may request a volume be created and/or placed by sending the request to CVS 204 (e.g., via an API call). In another example, the proxy 202 may request that a volume be modified. In another example, the proxy 202 may request a placement for a volume without creating or modifying the volume. The proxy 202 may receive and processes the request from another system, such as cloud system 106 described above in FIG. 1. The request may contain a number of different parameters including, but not limited to, volume capacity, volume throughput, volume location relative to the compute cluster (e.g., co-located storage), and/or whether it can be on the same node as another volume. In some examples, the request to create and/or place the volume is associated with an existing volume allocation. In such cases, the CVS 204 may retrieve previously stored allocation information (e.g., from a database) and use the placement information from that allocation to create and/or place the volume. If the previous volume allocation is found, the CVS 204 may proceed to action 416 and respond to the request. If, instead, the previous volume allocation is not found, the CVS 204 may proceed to action 404 to request a placement location.

At action 404, the CVS 204 may send a specification (e.g., a VDS) containing the requested volume parameters to the VPS 206. The specification may include some or all of the requirements requested by the proxy 202. The specification may be formatted in a generic format such as, for example, JSON or XML.

At action 406, the VPS 206 may send a query to database 208 requesting resource usage and/or limits data. In an example, the resource usage data is stored in database 208 as discussed above with respect to FIG. 2A and FIG. 3, including for example usage data obtained periodically and/or dynamically from one or more endpoints, as well as limits data either obtained from those endpoints, or maintained by the RT 210 in the database 208 on behalf of the endpoints, or some combination of the above.

At action 408, the database 208 may respond with the resource usage data to the requesting VPS 206.

At action 410, the VPS 206 may determine an optimal placement for the requested volume based on the usage data, limits data, and/or the information in the specification sent as the request from the CVS 204. As discussed above, the information in the specification may include constraints, or tags, and/or a selected scoring scheme. As discussed above, the optimal placement may be optimal from one or both of the storage platform perspective and the customer service perspective. In an example of optimal placement from the cloud storage perspective, the VPS 206 may account for the remaining capacity of each storage resource, the type of storage resource, the available throughput of the storage resource, and/or the physical proximity of the storage resource to the cloud computing system. In an example of optimal placement from the customer service perspective, the VPS 206 may account for one location having a faster perceived access by the customer as compared to another location. The optimal placement may be determined in part by comparing the requested requirements for the volume and resource usage received.

At action 412, the VPS 206 may respond to the CVS 204 with the optimal placement, as determined at action 410, for the volume. For example, the VPS 206 may send to the CVS 204 payload information including which cluster/node/aggregate to create/place the volume on, whether to create a new storage virtual machine, OS cluster information, node information, and aggregate information as determined by the VPS 206.

At action 414, the CVS 204 may create the requested volume according to the optimal placement information provided by the VPS 206. The CVS 204 may also, where appropriate, create any storage virtual machine for the volume(s) as well. In some examples, where the initial request was a volume placement request, the CVS 204 may store the placement information for later use (e.g., as part of the information stored for a volume allocation). The placement information may be stored in a database, as a file, or as an object as some examples.

At action 416, the CVS 204 may send a response to the proxy 202 indicating that the volume has been created. In some examples, the response may indicate that a location was identified for placing the volume without creating the volume. This response may then be routed to the customer 104, 105 via the cloud system 106 or may bypass the cloud system 106.

Figure 4B:
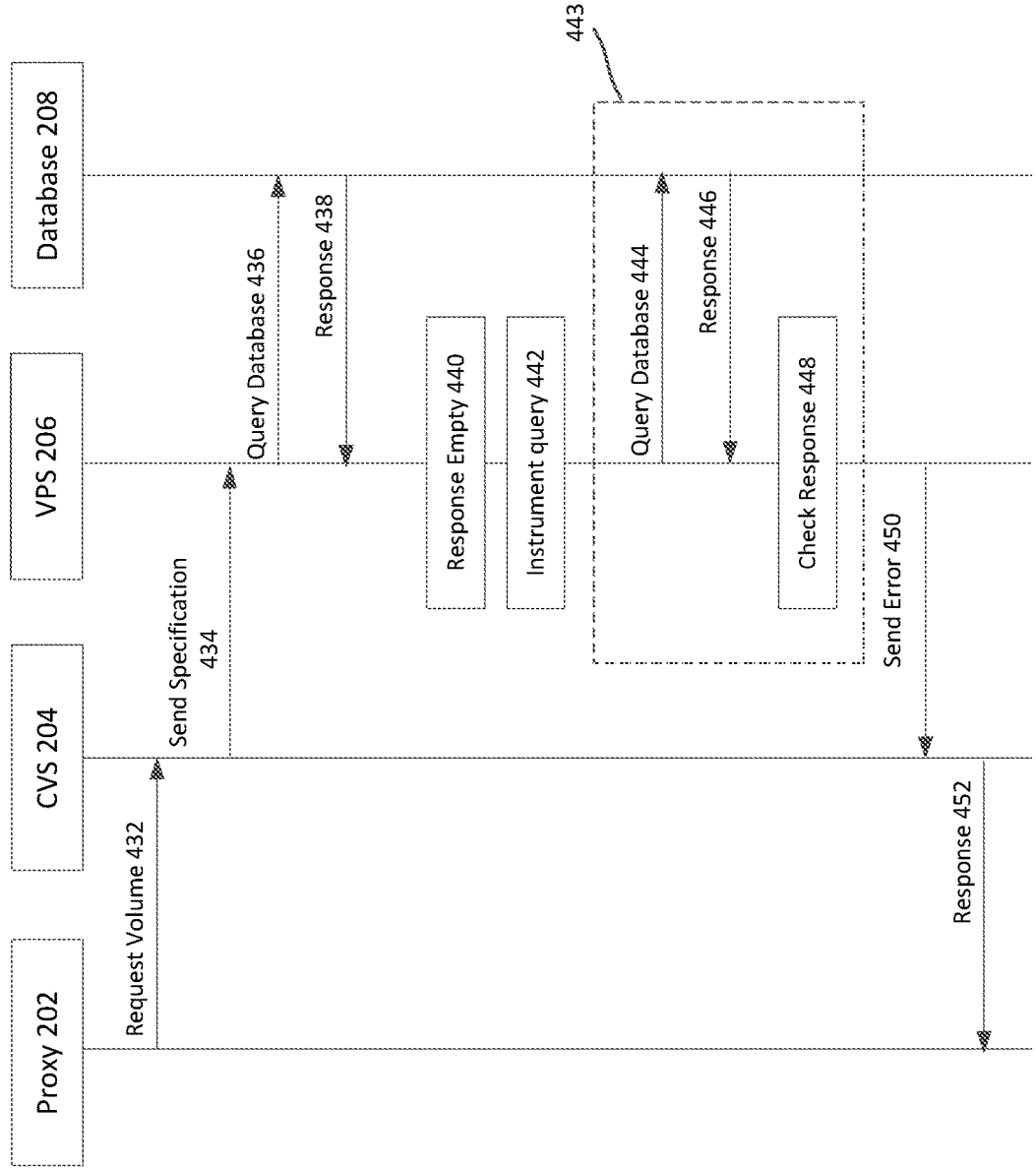

As noted previously, at times an effort to place a volume may fail, and it is desirable to isolate the cause of that failure. Turning now to FIG. 4B, an exemplary process flow 430 for determining the cause of a failure to determine placement location for a requested volume according to some embodiments of the present disclosure is illustrated. FIG. 4B illustrates the flow 430 between different components of a storage platform 200/102 including the proxy 202, and components of a cluster, such as cluster 203/112 including the cloud volume service (CVS) 204, the volume placement service (VPS) 206, and the database 208. While described with respect to a single volume, the actions illustrated in FIG. 4B equally apply to requests to create multiple volumes at the same time.

At action 432, the proxy 202 may request a volume be created and/or placed by sending the request to CVS 204 (e.g., via an API call). In another example, the proxy 202 may request that a volume be modified. In another example, the proxy 202 may request a placement for a volume without creating or modifying the volume. The proxy 202 may receive and processes the request from another system, such as cloud system 106 described above in FIG. 1. The request may contain a number of different parameters including, but not limited to, volume capacity, volume throughput, volume location relative to the compute cluster (e.g., co-located storage), and/or whether it can be on the same node as another volume.

At action 434, the CVS 204 may send a specification (e.g., a VDS) containing the requested volume parameters to the VPS 206. The specification may include some or all of the requirements requested by the proxy 202. The specification may be formatted in a generic format such as, for example, JSON or XML.

At action 436, the VPS 206 may send a query to database 208 requesting resource usage, limits data, and/or possible locations to place the requested volume. In an example, the resource usage data is stored in database 208 as discussed above with respect to FIG. 2A and FIG. 3, including for example usage data obtained periodically and/or dynamically from one or more endpoints, as well as limits data either obtained from those endpoints, or maintained by the RT 210 in the database 208 on behalf of the endpoints, or some combination of the above. In some embodiments, the VPS 206 may query the database 208 for a list of potential locations for placing the requested volume. The query sent to database 208 may be an optimized query that includes a plurality of queries. The VPS 208 may instrument the plurality of queries to generate the optimized query in order to improve the performance of database 208. In some examples, improving the performance of database 208 may include decreasing the amount of time required to process the query. The plurality of queries may be previously defined. The plurality of queries may correspond to the parameters provided with the request for volume placement at action 432.

At action 438, the database 208 may respond with one or more potential locations for placing the volume. In some embodiments, the database 208 may respond with resource use data for VPS 206 to determine a location.

At action 440, the VPS 206 may determine that the response from the database 208 is empty. That is, the response may not include any data, either location or use data. This may be considered a failure to find a location to place the requested volume. The response may be empty for various reasons. For example, there may not be any locations that satisfy all of the parameters of the volume placement request. As another example, there may not be enough space on any location that satisfies the other parameters of the volume placement request such that the volume capacity parameter may not be met. While, these are some examples of why the database may return an empty result, various other reasons may exist.

An empty result from the database does not provide a reason for failing to find a location to place the volume. Previously, a response has been returned indicating a failure to find a location with no further information. However, to improve the operation of the overall system, the VPS 206 may determine why no location, or use data, was returned from the database and provide this information to aid in selecting a different location to place the volume.

At action 442, the VPS 206 may re-instrument (e.g., break up or separate) the optimized query into the constituent plurality of queries. In some embodiments, the VPS 206 may have stored the plurality of queries separately and may not re-instrument the optimized query. In such embodiments, VPS 206 may retrieve the plurality of queries for use. The VPS 206 then enters loop 443 to perform actions 444, 446, and 448.

At action 444, the VPS 206 may send a query to database 208. For ease of discussion this query will be referred to as a debug query. In a first iteration of loop 443, the debug query may include a first query of the plurality of queries to database 208. In a second iteration of loop 443, the debug query may include the first query and a second query of the plurality of queries. In each successive iteration of loop 443 the debug query may include an additional one or more queries from the plurality of queries such. For example, by the eighth iteration, the debug query may include a first query, a second query, a third query, a fourth query, a fifth query, a sixth query, a seventh query, and an eighth query.

At action 446, the VPS 206 may receive a response from database 208. In each iteration of loop 443, database 208 may include a response to each debug query. The VPS 206 may store each response received from database 208 for later analysis. Each response may contain one or more locations for placing the requested volume or usage data.

At action 448, the VPS 206 may check each response received from database 208. For each response from database 208, the VPS 206 may verify whether or not the response is empty. If the response is not empty, the loop 443 may return to action 444 to begin another iteration of loop 443. Loop 443 may continue until either the response is empty or there are no more queries to add to the debug query. If the response received at action 446 is empty, the VPS 206 exits loop 443 and proceeds to action 450.

At action 450, the VPS 206 may send an error to CVS 204. The error may include a major code, a minor code, and detail flags as described above. VPS 206 may determine the cause of the empty result from database 208. VPS 206 may store each result received from database 208 while in loop 443 and each of the plurality of queries to determine a cause for the empty result at action 438. In some embodiments, VPS 206 may use the second to last result received at action 446 in loop 443 and the last query included in the debug query to determine a cause for the empty result. For example, if an empty result is received at action 446 during the fourth iteration of loop 443, VPS 206 may use the result received at action 446 in the third iteration of loop 443 and the fourth query from the plurality of queries to determine a cause for the empty result. This is because the result received at action 446 of the fourth iteration of loop 443 is empty. Analyzing the second to last result in context of the last query added to the debug query may provide a cause for the empty result received.

VPS 206 then sends an error code to CVS 204 indicating the nature of the cause or the empty results. For example, as potential locations are filtered out, none of the remaining potential locations may have enough free capacity to fulfill the placement request. In another example, none of the remaining potential locations may have the network speed required to fulfill the placement request. An error code indicating a reason for the failure to find a location to place the volume as requested may be provided to CVS 204. In some embodiments, the error response may include more information than an error code.

At action 452, the CVS 204 receives the error and sends a response to proxy 202. CVS 204 may receive the error code and translate it for the response to send to proxy 202. The translated error code may provide a user, such as customer 104, 105, information necessary to modify the volume placement request. For example, customer 104, 105 may modify the requested network speed to a slower network speed in order to place the volume. In some embodiments, the CVS 204 may include any additional information provided by VPS 206 in the response to proxy 202.

Figure 5:
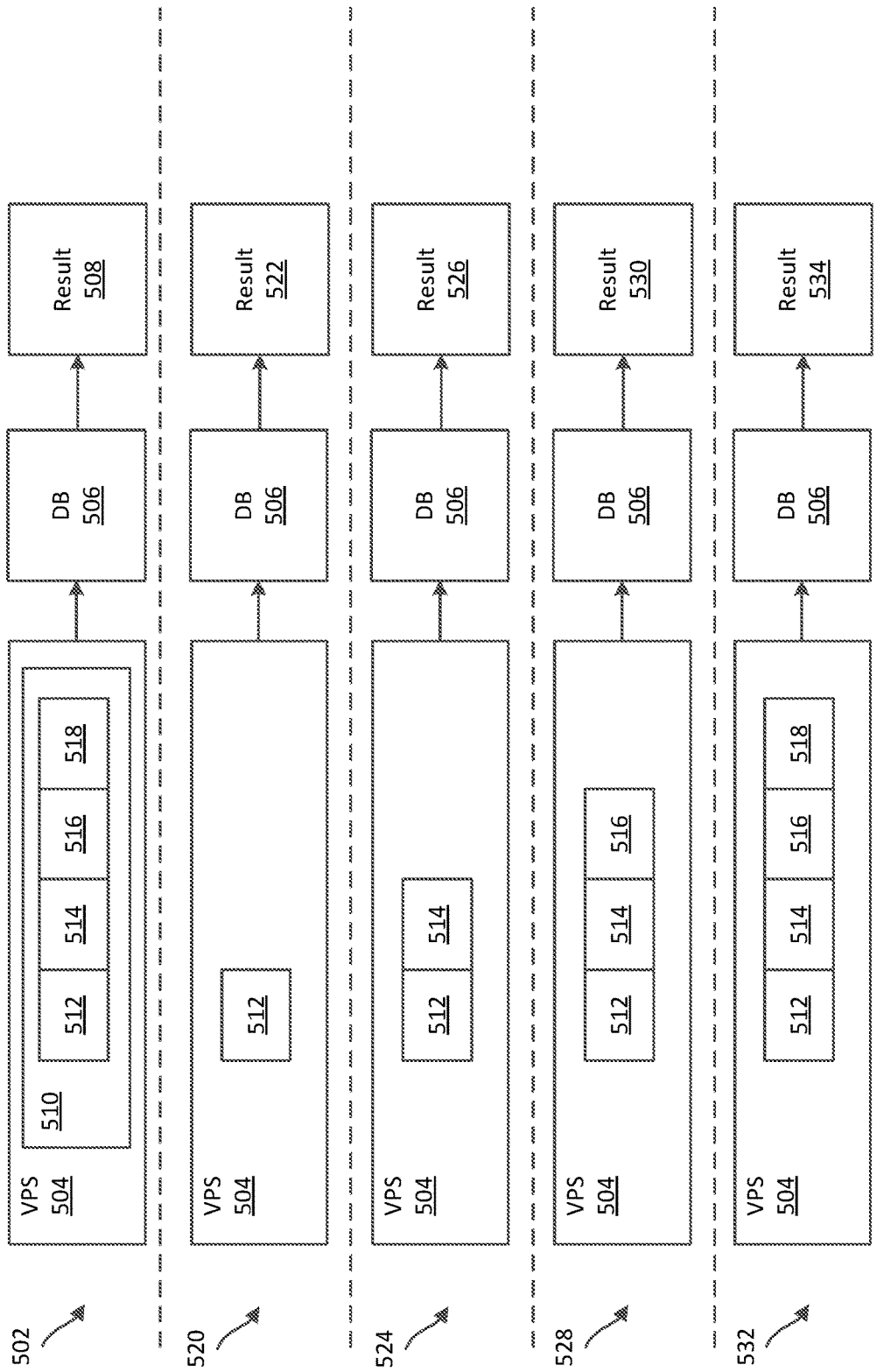
FIG. 5 illustrates a graphical representation of a process used to isolate a volume placement failure according to some embodiments of the present disclosure.

Turning to FIG. 5, a graphical representation of the process used to isolate the placement failure according to some embodiments of the present disclosure is illustrated. FIG. 5 depicts a volume placement service (VPS) 504, a database 506, and a result 508. VPS 504 may be an example of VPS 206 and database 508 may be an example of database 208 described above with respect to FIGS. 2A/2B. VPS 504 may build a database query 510 which may be a query optimized to improve performance of database 506. Database query 510 may include a plurality of individual queries, such as queries 512, 514, 516, and 518. In some embodiments, VPS 504 may modify queries 512, 514, 516, and 518 to build an optimized query, such as database query 510.

Iteration 502 may be an initial query of database 508. Iteration 502 may be an example of action 436 described above with respect to FIG. 4B. In iteration 502, VPS 504 may build database query 510 from individual queries 512, 514, 516, and 518. VPS 504 may send database query 510 to database 506. In other words, VPS 510 may query database 506 using database query 510. Database 506 may provide a result 508 to VPS 510 in response to database query 510. Generally, result 508 may include data in response to database query 510. For example, result 508 may include one or more potential locations to place a volume based on database query 510. However, there may be times when result 508 is empty. For example, based on database query 510, there may be no potential locations to place a volume, such as described above with respect to FIG. 4B. This may be considered a failure to place a volume.

In response to result 508 being empty, VPS 504 may determine to separate database query 510 into smaller queries in order to isolate the failure to return any results. In some examples, VPS 504 may separate database query 510 into individual queries 512, 514, 516, and 518. VPS 504 may iterate over the individual queries, similar to loop 443 described above with respect to FIG. 4B. FIG. 5 depicts four iterations, iterations 520, 524, 528, and 532, of this process to illustrate various aspects of the present disclosure. However, it is understood that there may be more or fewer iterations that may be with the number of iterations based, at least in part, on the size and complexity of database query 510. Iterations 520, 524, 528, and 532 will be described further below.

Iteration 520 may be a first iteration in determining a cause for empty result 508. VPS 504 may isolate query 512 to send to database 506. In some embodiments, query 512 may be sent in the same format as it was included in database query 510. In some embodiments, query 512 may not be instrumented for improved performance before being sent to database 506. Database 506 may return result 522. Result 522 may be different than result 508. For example, query 512 may filter information in database 506 based on one type of constraint and result 522 may be considered an intermediate result. In some examples, result 522 may be empty. In such examples, further iterations may not be performed, and VPS 504 may be able to isolate the cause of result 508 being empty. In some other examples, result 508 may include data that may be used in further iterations. In such cases, processing may continue to the next iteration.

Iteration 524 may be a second iteration in determining a cause for result 508 being empty. VPS 504 may isolate another query, for example query 514, to send to database 506. VPS 504 may combine queries 512 and 514 before sending to database 506. Database 506 may return result 526. Result 526 may be different than result 522. For example, query 514 may further filter information in database 506 based on one type of constraint. The constraint may be different than the constraint used in query 512. Therefore, if result 526 returns information, the result 526 may be different than information returned in result 522. In some examples, result 522 may be empty. In such examples, further iterations may not be performed, and VPS 504 may be able to determine a cause of result 508 being empty based at least in part on results 522 and 526 and queries 512 and 514. In some other examples, result 526 may include at least some data. In such examples, processing may continue to the next iteration.

Iteration 528 may be a third iteration in determining a cause for result 508 being empty. VPS 504 may isolate another query, such as for example query 516, to send to database 506. Query 516 may be combined with queries 512 and 514 before sending the query to database 506. Database 506 may return result 530 which may be different than results 526, 522, and 508. Result 530 may be different than other results for similar reasons to those discussed above with respect to results 522 and 526. If result 530 is empty, then further iterations may not be performed. If result 530 is not empty, then processing may continue to the next iteration.

Iteration 532 may be a fourth iteration in determining a cause for result 508 being empty. VPS 504 may another query, for example query 518, to send to database 506. VPS 506 may combine query 518 with queries 512, 514, and 516 before sending to database 506. Database 506 may return result 534 which may be different that results 508, 522, 526, and 530. Result 530 may be different than other results for similar reasons to those discussed above with respect to results 522 and 526. This process may be repeated as many times as necessary to include each of the plurality of queries in a combined query to determine a cause for the empty results of result 508.

Figure 6:
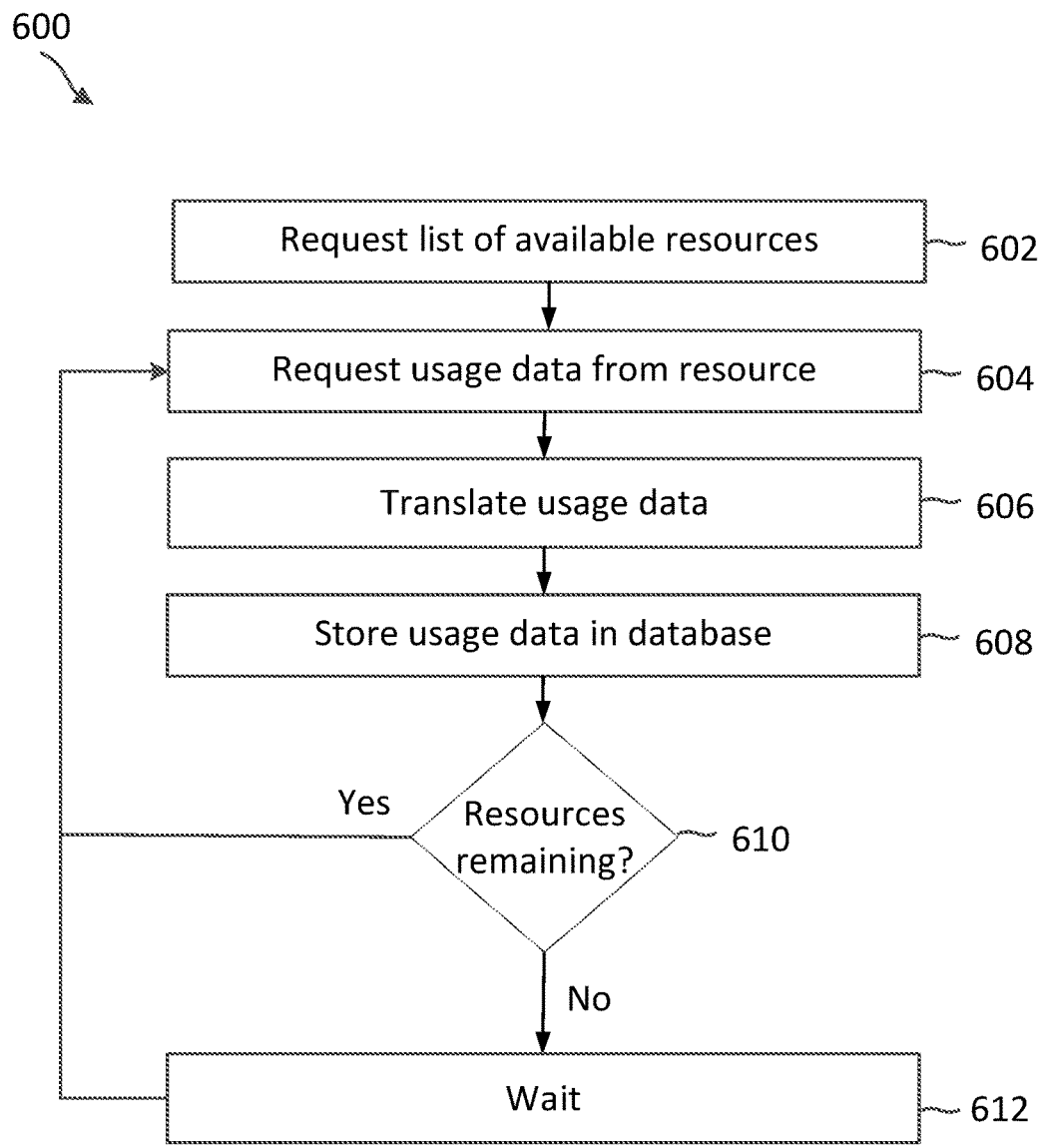
FIG. 6 illustrates a method for resource tracking of multiple storage resources according to some embodiments of the present disclosure.

Turning now to FIG. 6, a flow diagram of resource tracking according to some embodiments of the present disclosure is illustrated. In the description of FIG. 6, reference is made to elements of FIG. 1 and FIGS. 2A/2B for simplicity of illustration. In an embodiment, the method 600 may be implemented by an exemplary resource tracker (RT) 202. It is understood that additional steps can be provided before, during, and after the steps of method 600, and that some of the steps described can be replaced or eliminated for other embodiments of the method 600.

At block 602, RT 202 requests a list of available resources from CVI tables 212. The list of available resources contains the information needed for the RT 202 to address each OS resource endpoint and know what type of data to expect to receive. For other resource endpoint types, such as cloud volumes network resources and/or direct attach resource providers, block 602 may be skipped as the information for those endpoints might not be maintained by CVI 212.

At block 604, RT 202 requests usage data from a first resource. In one example, this may be resource $214_a$ as described above with respect to FIGS. 2A/2B and FIG. 3. This may involve the supervisor and worker components as noted with respect to FIG. 3, or in other examples the RT 210 generally.

At block 606, RT 202 translates the usage data received from the resource to a generic format. Translating the usage data to a generic format simplifies the storage of the usage data. Additionally, the use of a similar generic format simplifies comparison of usage data across different types of resources.

At block 608, the usage data (e.g., as translated at block 606) is stored in a database. In one example, the database may be the database 208 described above in FIGS. 2A/2B.

At block 610, determines whether there are any resource endpoints remaining that have not been queried. If it is determined that there are resources remaining to be queried, then the method 600 returns to block 604 and repeats blocks 604-608 with the next resource.

If, instead, it is determined that there are no resources remaining to be queried, then the method 600 proceeds to block 612.

At block 612, the method 600 waits a predetermined period of time. In one example, the method 500 may wait for 5 minutes. In another example, the method 600 may wait for more or less time (and, as noted previously, the wait time may be modified). In other examples, the wait may not be a period of time, but rather a wait until a dynamic request is received as a trigger. After the wait period is finished, the method 600 returns to block 604 to query the usage of each resource again and may proceed as discussed above generally. One or more resources may be fully booked and not be able to accept more work, such as for example, another volume, connection, etc. In some examples, the method 600 may continue to query resource usage even after the resource is fully booked in order to maintain an accurate account of available resources as resource usage changes (e.g., volume deleted, volume resized, connection removed, etc.)

Figure 7:
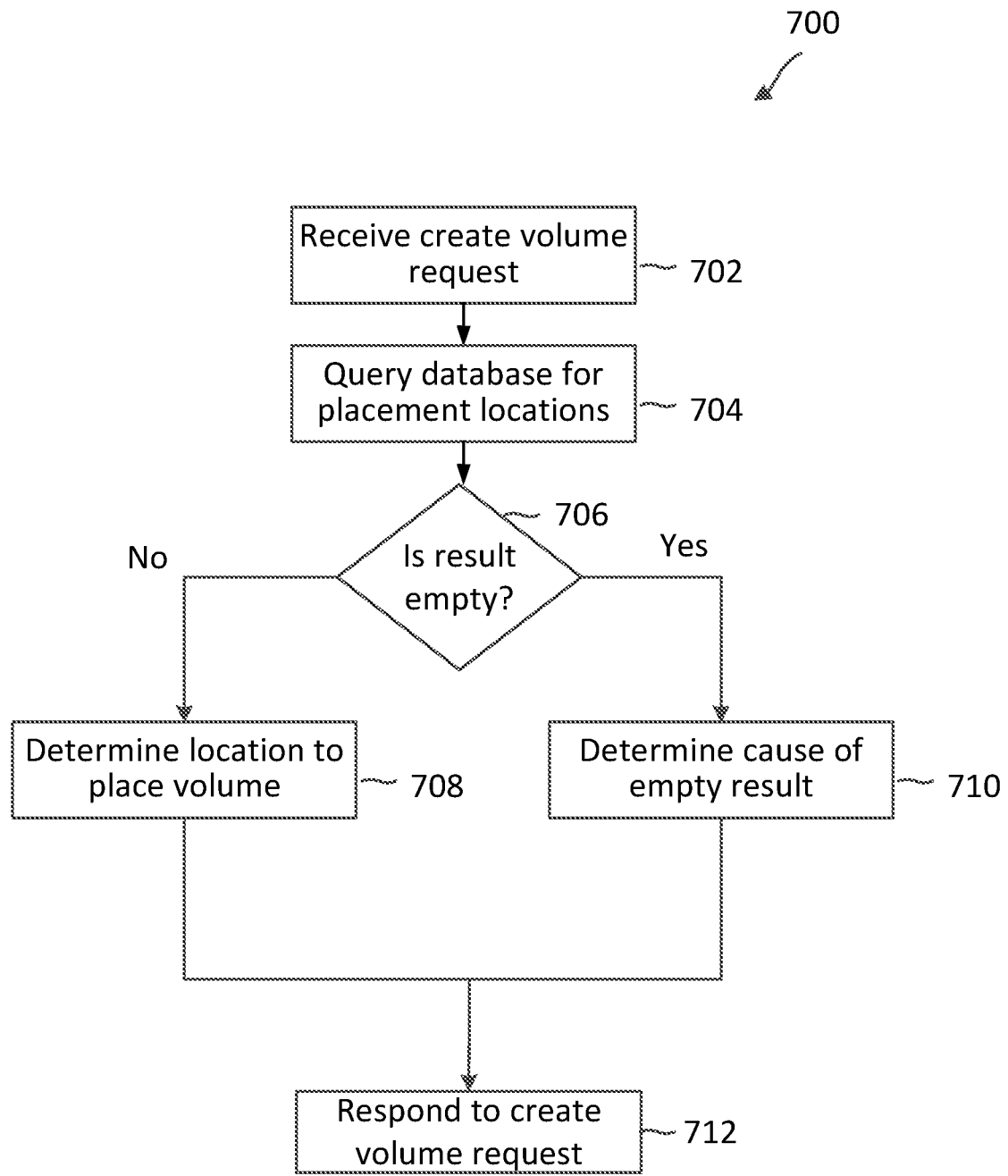
FIG. 7 illustrates a method of handling a request for volume placement according to some embodiments of the present disclosure.

Turning now to FIG. 7, a flow diagram of handling a failure to select a placement for a volume according to some embodiments of the present disclosure is illustrated. In the description of FIG. 7, reference is made to elements of FIG. 1 and FIGS. 2A/2B for simplicity of illustration. In an embodiment, the method 700 may be implemented by an exemplary storage platform 102. In particular, the method 700 may be implemented by a cluster, such as a Kubernetes® cluster, of the storage platform 102 (which may be hosted by cloud system 106 or separately by storage platform 102). It is understood that additional steps can be provided before, during, and after the steps of method 700, and that some of the steps described can be replaced or eliminated for other embodiments of the method 700.

At block 702, the cluster receives a create volume request. In another example, the cluster may receive a modify volume request. In another example, the cluster may receive a request for a volume placement without creating or modifying the volume. The create volume request may be received from a customer or system outside of the exemplary storage platform, which is routed to the cluster for processing. The request may be received at an external interface such as, for example, proxy 202 of storage platform 200. In some examples, the create volume request is associated with a previous volume allocation. In such examples, if the cluster finds placement information from the existing allocation, the method 700 may proceed to block 714 and create the volume. Otherwise, the method 700 proceeds to block 704.

At block 704, the cluster queries a database, using an optimized query, for potential locations to place the volume. The optimized query may allow the database to perform the processing and return one or more results without further interaction with the cluster (e.g., VPS 206). Because of this, volume placement requests may be processed in a shorter period of time than would otherwise be possible. However, in some examples the database may return an empty result. In such examples, the cluster may not know why the database returned an empty result.

At decision block 706, the cluster determines whether or not the results returned by the database are empty. If the cluster determines that the results returned by the database are not empty, then method 700 proceeds to block 708.

At block 708, the cluster determines an optimal location for the requested volume. As described above, the optimal location may be viewed from the storage platform perspective and/or the customer service perspective. The cluster may consider the requested volume requirements and the resource usage and limits when determining the optimal placement for the volume. Some examples of variables the cluster (e.g., the VPS 206) takes into account when making the determination include different types of storage hardware and corresponding limits, different capabilities and limits supported by different storage software versions, different networking hardware and corresponding limits, different capabilities and limits supported by networking hardware, sharing of the storage and networking infrastructure by multiple customers and workloads, application specific requirements (e.g., two volumes to not be hosted on the same storage hardware, volumes should be hosted with specific latency requirements, and/or other limitations or requirements). The cluster (e.g., cluster 203 including VPS 206) may additionally use a scoring scheme to determine the optimal placement, as discussed above. As a result, embodiments of the present disclosure may make optimal volume placement decisions across a fleet of heterogenous storage clusters, while also taking into account the environment's networking capabilities and limits.

Returning to decision block 706, if instead the cluster determines that the result returned by the database is empty, the method 700 proceeds to block 710.

At block 710, the cluster may determine a cause for the database returning an empty result at block 704. The cluster may iterate over the optimized query to receive intermediate results to aid in determining the cause of empty results. The cluster may use the results returned from the database for each iteration of the debug query in making the determination. For example, the cluster may track the result from each debug query in a data structure. The cluster may use the information in the data structure and combine it with information about the last query added to the debug query to determine why not locations were returned. This may be considered an error.

At block 712, the cluster may respond to the request to create a volume. In some examples, the cluster may respond with a location to place the volume requested. In some other examples, the cluster may respond with an indication of the failure to determine a location to place the requested volume.

Figure 8:
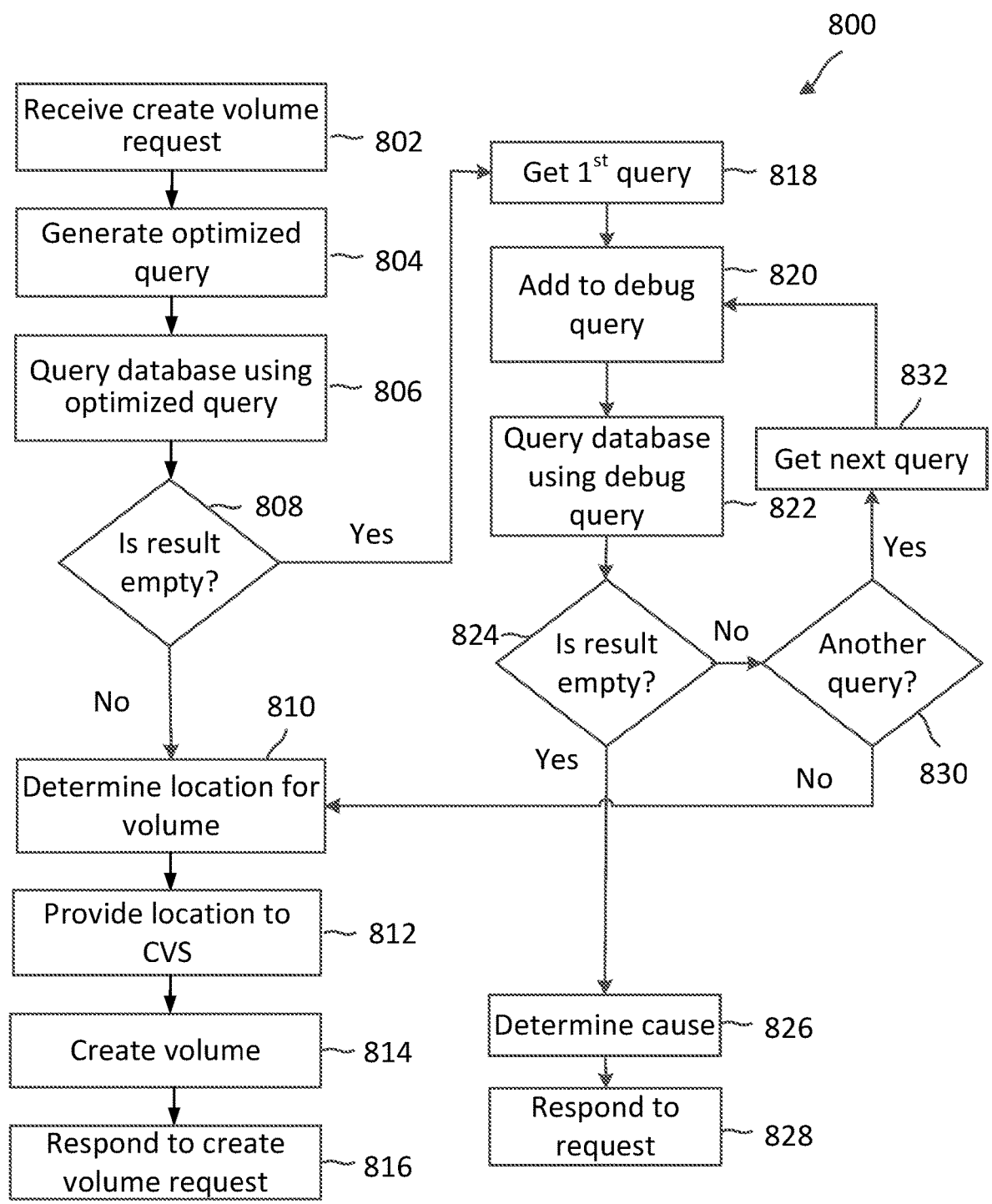
FIG. 8 illustrates a method of processing a request for volume placement according to some embodiments of the present disclosure.

Turning now to FIG. 8, a flow diagram of handling a failure to select a placement for a volume according to some embodiments of the present disclosure is illustrated. In the description of FIG. 8, reference is made to elements of FIG. 1 and FIGS. 2A/2B for simplicity of illustration. In an embodiment, the method 800 may be implemented by an exemplary storage platform 102. In particular, the method 800 may be implemented by a cluster, such as a Kubernetes® cluster, of the storage platform 102 (which may be hosted by cloud system 106 or separately by storage platform 102). It is understood that additional steps can be provided before, during, and after the steps of method 800, and that some of the steps described can be replaced or eliminated for other embodiments of the method 800.

At block 802, the cluster receives a create volume request. In another example, the cluster may receive a modify volume request. In another example, the cluster may receive a request for a volume placement without creating or modifying the volume. The create volume request may be received from a customer or system outside of the exemplary storage platform, which is routed to the cluster for processing. The request may be received at an external interface such as, for example, proxy 202 of storage platform 200. In some examples, the create volume request is associated with a previous volume allocation. In such examples, if the cluster finds placement information from the existing allocation, the method 800 may proceed to block 814 and create the volume. Otherwise, the method 800 proceeds to block 804.

At block 804, the cluster generates an optimized query. The optimized query may be instrumented to improve the performance of the database and/or the cluster. For example, VPS 206 may combine a plurality of queries into a single optimized query to send to database 208. The database 208 may run the optimized query and return potential locations for placement of the volume without further interaction with VPS 206. In some embodiments, the plurality of queries may be a plurality of states and the optimized query may be an aggregate pipeline combining the plurality of stages. The aggregate pipeline may be sent to the database, such as for example, MongoDB, for processing. In an alternative embodiment, the plurality of queries may be a plurality of structure query language (SQL) queries and the optimized query may be a combination of the plurality of SQL queries. The plurality of SQL queries may be instrumented to run more efficiently as a single query than individually. The single query may be sent to the database (e.g., Oracle, MySQL, etc.) for processing. In some embodiments, the cluster maintains a separate instance of the plurality of queries for later use.

Each query of the plurality of queries may further filter the possible locations to place the requested volume. For example, the first query may filter locations based on a selected hyperscaler and return the results. The second query may use the results as input and further filter the results based on host type. This may continue from hyperscaler, to stamp, to host, to node, and finally to aggregate. The resulting list of aggregates may be potential locations for creating the requested volume. The cluster (e.g., VPS 206) may determine which of the returned aggregates is the preferred location for the requested volume.

At block 806, the cluster queries a database using the optimized query for potential locations to place the volume. The optimized query allows the database to perform the processing and return one or more results without further interaction with the cluster (e.g., VPS 206). Because of this, volume placement requests may be processed in a shorter period of time than would otherwise be possible. However, in some examples the database may return an empty result. In such examples, the cluster does not know why the database returned an empty result.

At decision block 808, the cluster determines whether or not the result from the database is empty. If the result from the database is not empty, the method 800 proceeds to block 810.

At block 810, the cluster determines an optimal location for the requested volume. As described above, the optimal location may be viewed from the storage platform perspective and/or the customer service perspective. The cluster may consider the requested volume requirements and the resource usage and limits when determining the optimal placement for the volume. Some examples of variables the cluster (e.g., the VPS 206) takes into account when making the determination include different types of storage hardware and corresponding limits, different capabilities and limits supported by different storage software versions, different networking hardware and corresponding limits, different capabilities and limits supported by networking hardware, sharing of the storage and networking infrastructure by multiple customers and workloads, application specific requirements (e.g., two volumes to not be hosted on the same storage hardware, volumes should be hosted with specific latency requirements, and/or other limitations or requirements). The cluster (e.g., cluster 203 including VPS 206) may additionally use a scoring scheme to determine the optimal placement, as discussed above. As a result, embodiments of the present disclosure may make optimal volume placement decisions across a fleet of heterogenous storage clusters, while also taking into account the environment's networking capabilities and limits.

At block 812, the cluster provides the determined optimal volume location from the VPS 206 to the CVS 204. In an alternative example, the cluster may not find an existing location to place the requested volume. The cluster may respond with information to create a new resource to place the volume. Alternatively, the cluster may respond with an error indicating that a suitable location was not found. The following discussion will proceed with the discussion of the examples where an optimal location is identified by the VPS 206.

At block 814, the cluster creates the volume and places it at the chosen location. This may include one requested volume, or multiple if requested. In some examples, such as a volume placement request, the cluster may store the chosen location (e.g., in a database or file) for later use with a separate request to create the volume from the volume placement request.

At block 816, the cluster sends a response to the create volume request via the proxy back to the customer 104, 105, such as via the cloud system 106 or bypassing cloud system 106.

Returning to decision block 808, if instead, the cluster determines that the result from the database is empty, the method 800 proceeds to block 818.

At block 818, the cluster selects the first query form the plurality of queries used to generate the optimized query. The cluster (e.g., VPS 206) may deconstruct the optimized query to extract the plurality of queries that were used to generate the optimized query. Alternatively, the cluster may retrieve the separate instance of the plurality of queries that was previously stored.

At block 820, the cluster adds the selected query to a debug query. If the selected query is the first query, then the cluster generates a debug query to use to determine why no result was returned. The debug query may include the first query. Subsequent queries may be added to the debug query as method 800 iterates over the plurality of queries. For example, during a first iteration the debug query may include the first query. During a second iteration, the debug query may include the first query and a second query of the plurality of queries. During a third iteration, the debug query may include the first query, the second query, and a third query of the plurality of queries. This continues until there are no more queries in the plurality of queries to add to the debug query. As can be seen, this process is more processor and time intensive then running a single optimized query.

At block 822, the cluster queries the database using the debug query. Smaller debug queries, such as the first debug query including the first query, may return result quickly. However, the query will run slower with each iteration as the debug query grows and more queries are added to the debug query.

At decision block 824, the cluster determines whether or not the result returned from the database is empty. If the result returned from the database is empty, the method 800 proceeds to block 826.

At block 826, the cluster (e.g., VPS 206) determines the reason the database returned an empty result when running the optimized query. The cluster may use the results returned from the database for each iteration of the debug query in making the determination. For example, the cluster may track the result from each debug query in a data structure. The cluster may use the information in the data structure and combine it with information about the last query added to the debug query to determine why no locations were returned. This may be considered an error.

At block 828, the cluster sends a response to the create volume request via the proxy back to the customer 104, 105, such as via the cloud system 106 or bypassing cloud system 106. In some embodiments, the response may include an indication of a failure to find a location to place the volume. In some embodiments, the response may further include an error code indicating the reason for the failure. This may allow the customer 104, 105 to alter the request for volume placement in a way that a location may be found. For example, if a customer 104, 105 requests a volume be placed on an aggregate having a high-speed network connection. If an error code is returned that indicates that the placement failed because there are no suitable aggregates that have a high-speed network connection, the customer 104, 105 may modify the volume placement request to request a lower speed network connection. In some other embodiments, the system may automatically modify the request for volume placement in order to provide a location along with the error. For example, a comparable network to the requested high-speed network may be selected for placing the volume. Some examples of comparable network may be a default network or a network that was pre-approved as an alternative by the customer 104, 105.

Returning to decision block 824, if instead, the cluster determines that the result returned from the database is not empty, the method 800 proceeds to decision block 830.

At decision block 830, the cluster determines whether or not there is another query in the plurality of queries that has not yet been added to the debug query. If the cluster determines that there is another query, the method 800 proceeds to block 832.

At block 832, the cluster retrieves the next query available from the plurality of queries. The query is then added to the debug query in block 820 as the method 800 iterates through the plurality of queries.

Returning to decision block 830, if instead, the cluster determines that there are no more unused queries in the plurality of queries, the method 800 proceeds to block 810 where the cluster determines a location to place the volume based on the results. It may happen that the optimized query does not return a result from the database but that a fully constructed debug query does return one or more results from the database. This may happen, for example, because the database has been updated in the time between when the optimized query is run and when the cluster finishes iterating through the plurality of queries in the debug query. In such a scenario, the results may be valid and are returned for determining a location to place the volume.

Figure 9:
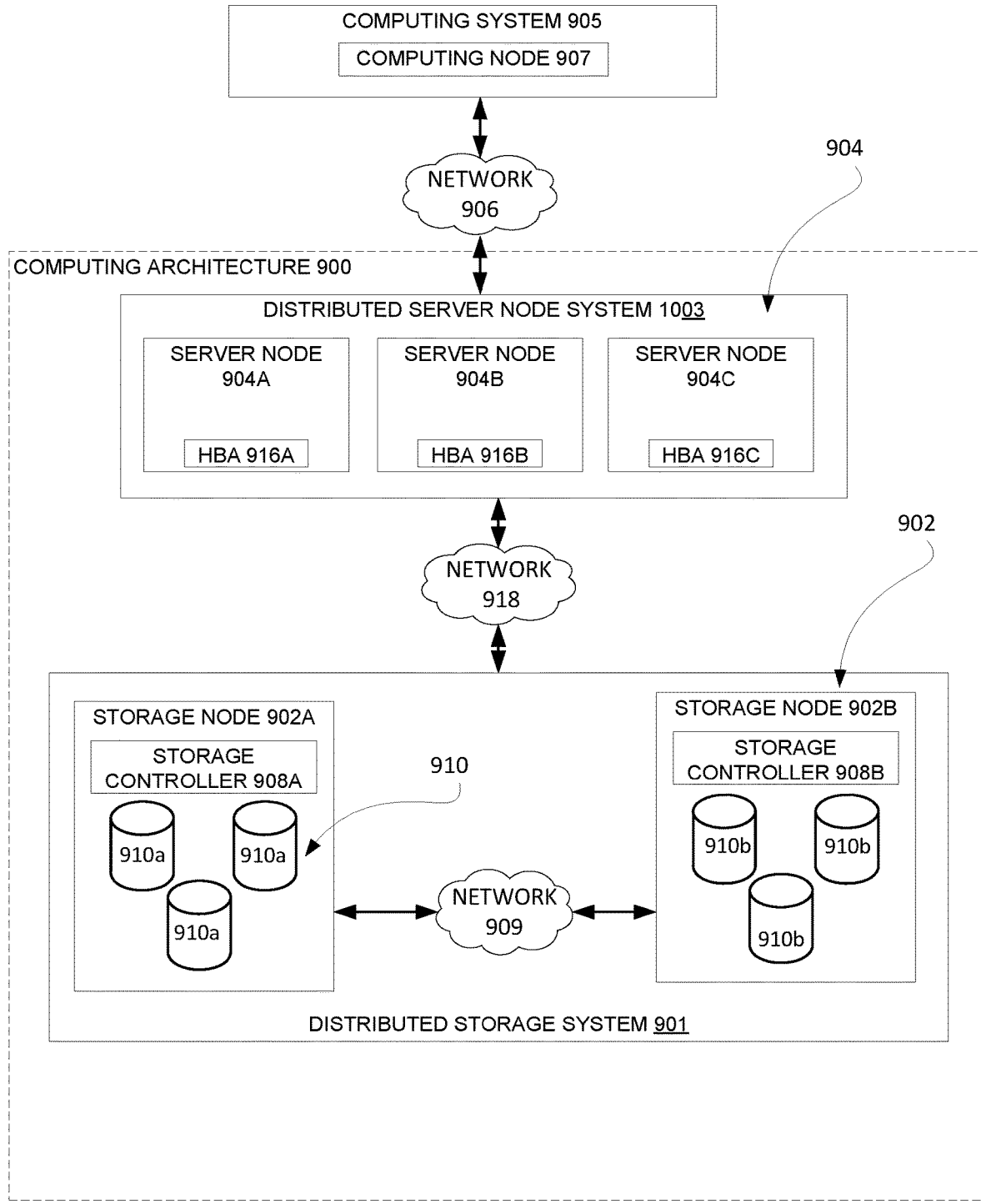
FIG. 9 is an illustration of an exemplary computing architecture according to some embodiments of the present description.

FIG. 9 is an illustration of a computing architecture 900 in accordance with one or more example embodiments. The computing architecture 900 is an example of one manner in which one or more of the computing architectures described herein may be implemented. The computing architecture 900, which, in some cases includes a distributed storage system 901 comprising a number of storage nodes 902 (e.g., storage node 902a, storage node 902b) in communication with a distributed server node system 903 comprising a number of server nodes 904 (e.g., server node 904a, server node 904b, server node 904c). The distributed storage system 901 and the distributed server node system 903 are examples in which containers, controllers, and/or clusters of the above figures may be implemented, for example.

A computing system 905 communicates with the computing architecture 900, and in particular, the distributed server node system 903, via a network 906. The network 906 may include any number of wired communications links, wireless communications links, optical communications links, or combination thereof. In one or more examples, the network 906 includes at least one of a Local Area Network (LAN), an Ethernet subnet, a PCI or PCIe subnet, a switched PCIe subnet, a Wide Area Network (WAN), a Metropolitan Area Network (MAN), the Internet, or some other type of network.

The computing system 905 may include, for example, at least one computing node 907. The computing node 907 may be implemented using hardware, software, firmware, or a combination thereof. In one or more other examples, the computing node 907 is a client (or client service, customer, etc.) and the computing system 905 that the client runs on is, for example, a physical server, a workstation, etc.

The storage nodes 902 may be coupled via a network 909, which may include any number of wired communications links, wireless communications links, optical communications links, or a combination thereof. For example, the network 909 may include any number of wired or wireless networks such as a LAN, an Ethernet subnet, a PCI or PCIe subnet, a switched PCIe subnet, a WAN, a MAN, a storage area network (SAN), the Internet, or the like. In some embodiments, the network 909 may use a transmission control protocol/Internet protocol (TCP/IP), a remote direct memory access (RDMA) protocol (e.g., Infiniband®, RDMA over Converged Ethernet (RoCE) protocol (e.g., RoCEv1, RoCEv2), iWARP), and/or another type of protocol. Network 909 may be local or remote with respect to a rack or datacenter. Additionally, or in the alternative, the network 909 may extend between sites in a WAN configuration or be a virtual network extending throughout a cloud. Thus, the storage nodes 902 may be as physically close or widely dispersed as needed depending on the application of use. In some examples, the storage nodes 902 are housed in the same racks. In other examples, the storage nodes 902 are located in different facilities at different sites around the world. The distribution and arrangement of the storage nodes 902 may be determined based on cost, fault tolerance, network infrastructure, geography of the server nodes 904, another consideration, or a combination thereof.

The distributed storage system 901 processes data transactions on behalf of other computing systems such as, for example, the one or more server nodes 904. The distributed storage system 901 may receive data transactions from one or more of the server nodes 904 and take an action such as reading, writing, or otherwise accessing the requested data. These data transactions may include server node read requests to read data from the distributed storage system 901 and/or server node write requests to write data to the distributed storage system 901. For example, in response to a request from one of the server nodes 904a, 904b, or 904c, one or more of the storage nodes 902 of the distributed storage system 901 may return requested data, a status indictor, some other type of requested information, or a combination thereof, to the requesting server node. While two storage nodes 902a and 902b and three server nodes 904a, 904b, and 904c are shown in FIG. 9, it is understood that any number of server nodes 904 may be in communication with any number of storage nodes 902. A request received from a server node, such as one of the server nodes 904a, 904b, or 904c may originate from, for example, the computing node 907 (e.g., a client service implemented within the computing node 907) or may be generated in response to a request received from the computing node 907 (e.g., a client service implemented within the computing node 907).

While each of the server nodes 904 and each of the storage nodes 902 is referred to as a singular entity, a server node (e.g., server node 904a, server node 904b, or server node 904c) or a storage node (e.g., storage node 902a, or storage node 902b) may be implemented on any number of computing devices ranging from a single computing system to a cluster of computing systems in communication with each other. In one or more examples, one or more of the server nodes 904 may be run on a single computing system, which includes at least one processor such as a microcontroller or a central processing unit (CPU) operable to perform various computing instructions that are stored in at least one memory. In one or more examples, at least one of the server nodes 904 and at least one of the storage nodes 902 reads and executes computer readable code to perform the methods described further herein to orchestrate parallel file systems. The instructions may, when executed by one or more processors, cause the one or more processors to perform various operations described herein in connection with examples of the present disclosure. Instructions may also be referred to as code, as noted above.

A processor may be, for example, a microprocessor, a microprocessor core, a microcontroller, an application-specific integrated circuit (ASIC), etc. The computing system may also include a memory device such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); at least one network interface such as an Ethernet interface, a wireless interface (e.g., IEEE 802.11 or other suitable standard), a SAN interface, a Fibre Channel interface, an Infiniband® interface, or any other suitable wired or wireless communication interface; and/or a user I/O interface coupled to one or more user I/O devices such as a keyboard, mouse, pointing device, or touchscreen.

In one or more examples, each of the storage nodes 902 contains any number of storage devices 910 for storing data and can respond to data transactions by the one or more server nodes 904 so that the storage devices 910 appear to be directly connected (i.e., local) to the server nodes 904.

For example, the storage node 902*a* may include one or more storage devices 910*a* and the storage node 902*b* may include one or more storage devices 910*b*. In various examples, the storage devices 910 include HDDs, SSDs, and/or any other suitable volatile or non-volatile data storage medium. In some examples, the storage devices 910 may be relatively homogeneous (e.g., having the same manufacturer, model, configuration, or a combination thereof). However, in other examples, one or both of the storage node 902*a* and the storage node 902*b* may alternatively include a heterogeneous set of storage devices 910*a* or a heterogeneous set of storage device 910*b*, respectively, that includes storage devices of different media types from different manufacturers with notably different performance.

The storage devices 910 in each of the storage nodes 902 are in communication with one or more storage controllers 908. In one or more examples, the storage devices 910*a* of the storage node 902*a* are in communication with the storage controller 908*a*, while the storage devices 910*b* of the storage node 902*b* are in communication with the storage controller 908*b*. While a single storage controller (e.g., 908*a*, 908*b*) is shown inside each of the storage node 902*a* and 902*b*, respectively, it is understood that one or more storage controllers may be present within each of the storage nodes 902*a* and 902*b*.

The storage controllers 908 exercise low-level control over the storage devices 910 in order to perform data transactions on behalf of the server nodes 904, and in so doing, may group the storage devices 910 for speed and/or redundancy using a protocol such as RAID (Redundant Array of Independent/Inexpensive Disks). The grouping protocol may also provide virtualization of the grouped storage devices 910. At a high level, virtualization includes mapping physical addresses of the storage devices 910 into a virtual address space and presenting the virtual address space to the server nodes 904, other storage nodes 902, and other requestors. Accordingly, each of the storage nodes 902 may represent a group of storage devices as a volume. A requestor can therefore access data within a volume without concern for how it is distributed among the underlying storage devices 910.

The distributed storage system 901 may group the storage devices 910 for speed and/or redundancy using a virtualization technique such as RAID or disk pooling (that may utilize a RAID level). The storage controllers 908*a* and 908*b* are illustrative only; more or fewer may be used in various examples. In some cases, the distributed storage system 901 may also be communicatively coupled to a user display for displaying diagnostic information, application output, and/or other suitable data.

With respect to the distributed server node system 903, each of the one or more server nodes 904 includes any computing resource that is operable to communicate with the distributed storage system 901, such as by providing server node read requests and server node write requests to the distributed storage system 901. In one or more examples, each of the server nodes 904 is a physical server. In one or more examples, each of the server nodes 904 includes one or more host bus adapters (HBA) 916 in communication with the distributed storage system 901. The HBA 916 may provide, for example, an interface for communicating with the storage controllers 908 of the distributed storage system 901, and in that regard, may conform to any suitable hardware and/or software protocol. In various examples, the HBAs 916 include Serial Attached SCSI (SAS), iSCSI, InfiniBand®, Fibre Channel, and/or Fibre Channel over Ethernet (FCoE) bus adapters. Other suitable protocols include SATA, eSATA, PATA, USB, and FireWire.

The HBAs 916 of the server nodes 904 may be coupled to the distributed storage system 901 by a network 918 comprising any number of wired communications links, wireless communications links, optical communications links, or combination thereof. For example, the network 918 may include a direct connection (e.g., a single wire or other point-to-point connection), a networked connection, or any combination thereof. Examples of suitable network architectures for the network 918 include a LAN, an Ethernet subnet, a PCI or PCIe subnet, a switched PCIe subnet, a WAN, a MAN, the Internet, Fibre Channel, or the like. In many examples, a server node 904 may have multiple communications links with a single distributed storage system 901 for redundancy. The multiple links may be provided by a single HBA 916 or multiple HBAs 916 within the server nodes 904. In some examples, the multiple links operate in parallel to increase bandwidth.

In one or more examples, each of the server nodes 904 may have another HBA that is used for communication with the computing system 905 over the network 907. In other examples, each of the server nodes 904 may have some other type of adapter or interface for communication with the computing system 905 over the network 907.

To interact with (e.g., write, read, modify, etc.) remote data, a HBA 916 sends one or more data transactions to the distributed storage system 901. Data transactions are requests to write, read, or otherwise access data stored within a volume in the distributed storage system 901, and may contain fields that encode a command, data (e.g., information read or written by an application), metadata (e.g., information used by a storage system to store, retrieve, or otherwise manipulate the data such as a physical address, a logical address, a current location, data attributes, etc.), and/or any other relevant information. The distributed storage system 901 executes the data transactions on behalf of the server nodes 904 by writing, reading, or otherwise accessing data on the relevant storage devices 910. A distributed storage system 901 may also execute data transactions based on applications running on the distributed server node system 903. For some data transactions, the distributed storage system 901 formulates a response that may include requested data, status indicators, error messages, and/or other suitable data and provides the response to the provider of the transaction.

In one or more examples, an orchestration system may be a container orchestration system that enables file system services to be run in containers and volumes to be mounted from the distributed storage system 901 to the distributed server node system 903, in particular according to embodiments of the present disclosure.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:

sending, by a volume placement system of a storage platform in response to a request to place a volume, a first query to a database of the storage platform for a location to place the volume, the request comprising requested volume parameters and the database storing data for one or more resources of the storage platform, and the first query comprising a plurality of queries according to the requested volume parameters;

receiving, by the volume placement system in response to the first query, a first result from the database, the first result comprising an empty result;

sending, by the volume placement system in response to the empty result, a second query of the plurality of queries to the database, the second query comprising one query deconstructed from the plurality of queries and providing a first network hierarchy level of filtering of possible locations to place the volume according to the requested volume parameters;

receiving, by the volume placement system, a second result from the database in response to the second query, the second result comprising a filtered list of possible locations at the first network hierarchy level to place the volume;

iteratively sending, by the volume placement system in response to the second result, a fourth query comprising a combination of the second query and a third query comprising another query deconstructed from the plurality of queries to the database and providing a second network hierarchy level of filtering of possible locations to place the volume that further filters the filtered list of possible locations at the first network hierarchy level according to the second network hierarchy level and the requested volume parameters;

receiving, by the volume placement system, a third result from the database in response to the fourth query, the third result being empty of possible locations to place the volume and including a log of details associated with the fourth query;

determining, by the volume placement system in response to the third result being empty, from the log a cause of the empty third result including at least the network hierarchy level of the third query; and sending by the volume placement system in response to the request to place the volume, with an error code indicating a reason for failing to provide the location to place the volume according to the requested volume parameters, the reason being based on the cause of the empty third result.

2. The method of claim 1, wherein the first query is instrumented to increase a speed of receiving a result from the database.

3. The method of claim 1, wherein the error code includes a major error code and a minor error code.

4. The method of claim 1, wherein the first query filters a first network hierarchy level comprises a cloud computing cluster level, and the second network hierarchy level comprises an operating cluster level, the operating cluster level being closer to a volume placement location than the cloud computing cluster level.

5. The method of claim 1, wherein the requested volume parameters comprises at least one of volume capacity, volume throughput, volume location relative to a compute cluster, or permission to be on a same node as another volume.

6. The method of claim 1, wherein the analyzing further comprises:

generating, by the volume placement system based on the log, a major code identifying the second network hierarchy level at which the empty third result occurred and a minor code identifying why remaining candidates in the filtered list of possible locations were filtered out by the third query.

7. The method of claim 1, further comprising:

automatically modifying the request, by the volume placement system based on the error, to place the volume.

8. A computing device comprising:

a memory containing machine readable medium comprising machine executable code having stored thereon instructions for performing a method of isolating a failure to provide a location for placing a volume in a plurality of storage systems in response to a request that comprises requested volume parameters for placing the volume; and a processor coupled to the memory, the processor configured to execute the machine executable code to cause the processor to:

receive a trigger to replay a first query that is an optimized query to identify a location to place the volume in response to a first result of the optimized query from a database being empty, the optimized query including a plurality of queries according to the requested volume parameters;

send, in response to the trigger, a second query of the plurality of queries to the database as part of the replay of the first query, the second query comprising one query deconstructed from the plurality of queries and providing a first network hierarchy level of filtering of possible locations to place the volume according to the requested volume parameters;

receive a second result from the database in response to the second query the second result comprising a filtered list of possible locations at the first network hierarchy level to place the volume;

send a combination of the second query and a third query deconstructed from the plurality of queries to the database as part of the replay of the optimized query, the third query providing a second network hierarchy level of filtering to the filtered list of possible locations at the first network hierarchy level and according to the requested volume parameters;

receive a third result from the database in response to the combination of the second query and the third query, the third result being empty of possible locations to place the volume and comprising a log of details associated with the combination of the second and third queries;

determine a cause of the empty third result being empty based at least in part on the third query and the log, including identifying a location in an object hierarchy of the database corresponding to the second network hierarchy level; and respond to the request to place the volume with an indication of the failure to place the volume according to the requested volume parameters, the indication being based on the cause of the third result being empty.

9. The computing device of claim 8, wherein the requested volume parameters comprises at least one of volume capacity, volume throughput, volume location relative to a compute cluster, or permission to be on a same node as another volume.

10. The computing device of claim 8, wherein the optimized query alters at least one of the plurality of queries to improve operation of the database.

11. The computing device of claim 8, wherein the first network hierarchy level comprises a cloud computing cluster level, and the second network hierarchy level comprises an operating cluster level, the operating cluster level being closer to a volume placement location than the cloud computing cluster level.

12. The computing device of claim 8, wherein the processor is further configured to:

instrument the optimized query including modifying at least one of the plurality of queries.

13. The computing device of claim 8, wherein the indication of the failure further includes a major code identifying the second network hierarchy level of the object hierarchy at which the failure occurred and a minor code identifying a cause of the failure.

14. The computing device of claim 8, wherein the processor is further configured to:

modify, in response to the indication of the failure, at least one of the requested volume parameters to create a modified request for providing the location for placing the volume.

15. A non-transitory machine-readable medium having stored thereon instructions for performing a method of isolating a failure to provide a location for placing a volume in a plurality of storage systems in response to a request that comprises requested volume parameters for placing the volume, which when executed by at least one machine, causes the at least one machine to:

send a first query that comprises an optimized query to a database in response to the request, the optimized query including a plurality of queries according to the requested volume parameters;

send a second query to the database in response to receiving a first empty result from the database, the second query comprising one query deconstructed from the plurality of queries and providing a first network hierarchy level of filtering of possible locations to place the volume according to the requested volume parameters;

send a combination of the second query and a third query deconstructed from the plurality of queries to the database in response to receiving a filtered list of possible locations from the database responsive to the second query, the third query providing a second network hierarchy level of filtering to the filtered list of possible locations at the first network hierarchy level and according to the requested volume parameters;

respond to the request for the location to place the volume with an error indicating a reason for failing to provide the location in response to receiving a third result from the database responsive to the combination of the second query and the third query, and according to the requested volume parameters; and automatically modify the request for the location to place the volume based on the reason for failing to provide the location in response to the error.

16. The non-transitory machine-readable medium of claim 15, wherein each of the plurality of queries filters a different network hierarchy level of information in the database, the different network hierarchy levels including at least one of a cloud computing cluster level, a stamp level, an operating cluster level, a node level, or an aggregate level.

17. The non-transitory machine-readable medium of claim 15, further comprising machine executable code that causes the machine to:

instrument the optimized query, including modifying at least one of the plurality of queries to improve performance of the database.

18. The non-transitory machine-readable medium of claim 15, wherein the automatically modifying the request further includes substituting a constraint of the request included with the requested volume parameters with a comparable constraint.

19. The non-transitory machine-readable medium of claim 15, wherein the first network hierarchy level of filtering comprises a cloud computing cluster level of filtering and the second network hierarchy level of filtering comprises an operating cluster level of filtering, the operating cluster level of filtering being different than the cloud computing cluster level of filtering by being closer to a volume placement location than the cloud computing cluster level.

20. The non-transitory machine-readable medium of claim 15, further comprising machine executable code that causes the machine to:

analyze a log of the combination of the second query and the third query to determine the reason for failing to provide the location, the reason comprising a level of the database that filtered out remaining locations from the filtered list by the second network hierarchy level of filtering.

* * * * *